US011347472B2

(12) United States Patent
Lan et al.

(10) Patent No.: US 11,347,472 B2
(45) Date of Patent: May 31, 2022

(54) SYSTEM, APPARATUS AND METHOD FOR GENERATING SOUND

(71) Applicant: SZ DJI TECHNOLOGY CO., LTD., Shenzhen (CN)

(72) Inventors: Qiu Lan, Shenzhen (CN); Wenlong Xiao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/930,128

(22) Filed: Jul. 15, 2020

(65) Prior Publication Data

US 2020/0348904 A1 Nov. 5, 2020

Related U.S. Application Data

(63) Continuation of application No. 15/727,784, filed on Oct. 9, 2017, now Pat. No. 10,725,728, which is a (Continued)

(51) Int. Cl.
| | |
|---|---|
| *G06F 17/00* | (2019.01) |
| *G06F 3/16* | (2006.01) |
| *G05B 19/042* | (2006.01) |
| *G10K 15/04* | (2006.01) |
| *B64C 39/02* | (2006.01) |

(Continued)

(52) U.S. Cl.
CPC ............ *G06F 3/165* (2013.01); *B64C 39/024* (2013.01); *B64D 45/00* (2013.01); *G05B 19/042* (2013.01); *G10K 15/04* (2013.01); *G10L 19/00* (2013.01); *B64C 2201/14* (2013.01); *G05B 2219/23249* (2013.01)

(58) Field of Classification Search
CPC ... G06F 3/165; B64C 39/024; B64C 2201/14; B64D 45/00; G05B 19/042; G05B 2219/23249; G10K 15/04; G10L 19/00
USPC .......................................................... 700/94
See application file for complete search history.

(56) References Cited

U.S. PATENT DOCUMENTS

| 2,304,022 A | 12/1942 | Sanders |
|---|---|---|
| 3,736,880 A | 6/1973 | Ross |

(Continued)

FOREIGN PATENT DOCUMENTS

| CN | 1082141 A | 2/1994 |
|---|---|---|
| CN | 1685760 A | 10/2005 |

(Continued)

OTHER PUBLICATIONS

ESC electronic sound control documents available at least 2014 (Year: 2014).

(Continued)

*Primary Examiner* — Paul C McCord
(74) *Attorney, Agent, or Firm* — Anova Law Group, PLLC

(57) ABSTRACT

A method for generating sound with a motor, including: generating a motor-driving signal having an audio signal component; applying the motor-driving signal to the motor, wherein the motor-driving signal drives the motor to generate a sound corresponding to the audio signal component; applying a bandpass filter to the motor-driving signal to generate a filtered motor-driving signal; and applying the filtered motor-driving signal to a speaker to present audio content consistent with the sound generated by the motor.

20 Claims, 29 Drawing Sheets

Related U.S. Application Data continuation of application No. PCT/CN2015/089691, filed on Sep. 16, 2015.

(51) Int. Cl.
  *B64D 45/00* (2006.01)
  *G10L 19/00* (2013.01)

(56) References Cited

U.S. PATENT DOCUMENTS

| | | | |
|---|---|---|---|
| 4,326,355 | A | 4/1982 | Watanabe |
| 4,399,427 | A | 8/1983 | Neese |
| 5,220,246 | A | 6/1993 | Ide et al. |
| 5,784,670 | A * | 7/1998 | Sasahara .......... B41J 29/38 399/91 |
| 5,939,853 | A | 8/1999 | Masauji et al. |
| 7,737,793 | B1 | 6/2010 | Ying et al. |
| 8,150,072 | B2 | 4/2012 | Stahl |
| 9,654,862 | B2 | 5/2017 | Strömbäck |
| 2006/0028751 | A1 | 2/2006 | Takeuchi |
| 2010/0134058 | A1 | 6/2010 | Nagashima et al. |
| 2016/0083073 | A1 | 3/2016 | Beckman |
| 2016/0112810 | A1 | 4/2016 | Thigpen |

FOREIGN PATENT DOCUMENTS

| | | | |
|---|---|---|---|
| CN | 101020120 | A | 8/2007 |
| CN | 101326852 | A | 12/2008 |
| CN | 101729625 | A | 6/2010 |
| CN | 101771381 | A | 7/2010 |
| CN | 102900680 | A | 1/2013 |
| CN | 203483862 | U | 3/2014 |
| CN | 103731080 | A | 4/2014 |
| CN | 103824485 | A | 5/2014 |
| CN | 203850995 | U | 9/2014 |
| CN | 104344535 | A | 2/2015 |
| CN | 104765309 | A | 7/2015 |
| DE | 102010043973 | A1 | 5/2012 |
| DE | 102012211689 | A1 | 1/2014 |
| GB | 2509132 | A | 6/2014 |
| JP | H01275175 | A | 11/1989 |
| JP | H08079896 | A | 3/1996 |
| JP | 2003341599 | A | 12/2003 |
| JP | 2004158141 | A | 6/2004 |
| JP | 2005260510 | A | 9/2005 |
| JP | 2005265710 | A | 9/2005 |
| JP | 2006500887 | A | 1/2006 |
| JP | 2007067999 | A | 3/2007 |
| JP | 2011035681 | A | 2/2011 |
| JP | 2012076628 | A | 4/2012 |
| JP | 3199308 | U | 8/2015 |
| WO | 2007013756 | A3 | 3/2007 |
| WO | 2007049091 | A1 | 5/2007 |
| WO | 2012063823 | A1 | 5/2012 |

OTHER PUBLICATIONS

Garcia-Perez et al; Application of high-resolution spectral analysis for identifying faults in induction motors by means of sound (Year: 2011).

Mathe: Product Sound: Acoustically pleasant motor drives (Year: 2010).

Elbouchikhi: Induction machine bearing faults detection (Year: 2010).

Siren Organ (Year: 2010).

The World Intellectual Property Organization (WIPO) International Search Report and Written Opinion for PCT/CN2015/089691 dated Jun. 15, 2016 8 Pages.

* cited by examiner

SYSTEM, APPARATUS AND METHOD FOR GENERATING SOUND

CROSS-REFERENCE TO RELATED APPLICATIONS

This application is a continuation of application Ser. No. 15/727,784, filed on Oct. 9, 2017, which is a continuation of International Application No. PCT/CN2015/089691, filed on Sep. 16, 2015, the entire contents of both of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to audio signal processing and more particularly, but not exclusively, to systems, apparatuses and methods for generating sound.

BACKGROUND

Mobile platforms, such as manned and unmanned vehicles, can be used for performing surveillance, reconnaissance, and exploration tasks for military and civilian applications.

For example, an unmanned aerial vehicle (UAV) may be outfitted with a functional payload, such as a sensor for collecting data from the surrounding environment or a substance to be delivered to a destination. Even though UAV technology has had great development, further improvements are always desired.

Figure 1:
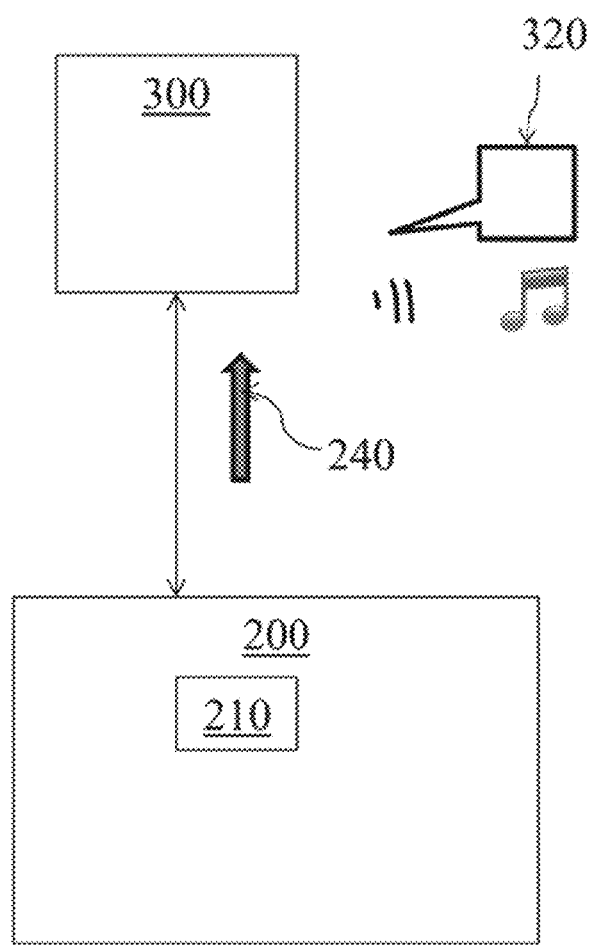
FIG. 1 is an exemplary top level diagram illustrating an embodiment of a system for generating sound via a motor.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

A UAV is usually controlled either autonomously by onboard computers or by the remote control of a pilot on the ground. The UAV needs to inform a human of status of the UAV and error message related to components of the UAV such as the onboard computers and sensors.

When the disclosed systems, apparatuses, and methods are not used, communication between a mobile platform and a human is often not easy. For example, UAVs present information to a human via indicator lights. The number of indicator lights that are turned on and the combination of colors of the indicator lights can correspond to a message. A human needs to look up the corresponding message in a user manual, which requires time and labor. The UAVs may also present information to a human via a single pitch beep sound. However, a human still needs to look up in a user manual for the message corresponding to the beep. Further, the beep sound is a monotonous sound, so amount of information that can be conveyed by such a sound is significantly limited.

Since currently-available visual and audio communication methods between a mobile platform and a human do not provide rich information in a manner that is naturally comprehensible to the human, systems and methods for producing high-quality sound using a mobile platform without a need to install additional hardware can prove desirable and provide a basis for a wide range of system applications. Exemplary application can include conveying warning, error message, and/or entertainment content to an operator or other user of the mobile platform.

The present disclosure sets forth systems, apparatuses, and methods for generating sound, overcoming disadvantages of prior systems and methods. Thus, the disclosure set forth herein provides solutions to the technical problems of efficient communication between a mobile platform and another entity, and further contributes advancement of mobile platform technology as well as audio signal processing technology.

This above solutions can be achieved, according to one embodiment disclosed herein, by a system 100 as illustrated in FIG. 1.

Turning to FIG. 1, the system 100 is shown as including a motor controller 200. The motor controller 200 can include a processor 210 for performing data acquisition, data processing, and any other functions and operations described herein for controlling an operation of the motor controller 200. Without limitation, the motor controller 200 can include one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like. Although described as including a single processor 210 for purposes of illustration only, the motor controller 200 can include any suitable number of uniform and/or different processors 210.

Optionally, the motor controller 200 can further include one or more discrete circuits (not shown). The discrete circuits can use interconnected individual resistors, capacitors, diodes, transistors, and other components to achieve the circuit function. The motor controller 200, for example, can include the processor 210 and/or the discrete circuits for performing at least a portion of, or all of, the disclosed functions of the motor controller 200.

The motor controller 200 can be configured to produce a motor-driving signal 240 according to an audio signal (not shown). Thus, the motor-driving signal 240 produced according to the audio signal can include an audio signal component that is based upon the audio signal. The audio signal can refer to a representation of a sound 320. An exemplary audio signal can include an electrical voltage signal and/or an electrical current signal.

The sound 320 represented by the audio signal can include vibration that propagates as a mechanical wave of pressure and displacement through a medium. An exemplary medium can include solids, gases (such as air), liquids (such as water) and/or the like. The sound 320 can include an audible sound having a frequency within a limit of human hearing, i.e., a frequency ranging from 20 Hz to 20 kHz. Additionally and/or alternatively, the sound 320 can include a mechanical wave having a frequency outside the limit of human hearing. That is, the sound 320 can have a frequency less than 20 Hz and/or greater than 20 kHz. For example, the sound 320 can include an ultrasound wave and/or an infrasound wave.

On one hand, the audio signal may be synthesized directly or may originate at a transducer. An exemplary transducer can include a microphone, musical instrument pickup, phonograph cartridge, or tape head. For example, the microphone can be an acoustic-to-electric transducer and/or sensor that can convert a sound into an audio signal. On the other hand, a loudspeaker and/or a headphone can convert the audio signal into a sound. The audio signal can be an analog signal and/or a digital signal.

As shown in FIG. 1, the system 100 can further include a motor 300 coupled to the motor controller 200. The motor 300 can include any machine configured to convert one form of energy into mechanical energy. An exemplary motor 300 can include a brushless motor, a direct current (DC) motor, a stepper motor, an alternating current (AC) induction motor, and/or a brushed motor, without limitation.

The motor controller 200 can be configured to drive the motor 300 with the motor-driving signal 240 to generate the sound 320 corresponding to the audio signal. The motor 300 can generate the sound 320 that corresponds to the audio signal. Stated somewhat differently, the motor-driving signal 240 with an audio signal component can be applied to the motor 300. Thereby, when driven by the motor-driving signal 240, the motor 300 can generate the sound 320 that corresponds to the audio signal component.

The motor-driving signal 240 can include any signal that enables the motor 300 to generate a mechanical motion. An exemplary motor-driving signal 240 can include an electric voltage signal, an electric current signal, a magnetic signal, and/or an optical signal, without limitation. In some embodiments, the motor-driving signal 240 can include a pulsing signal. An exemplary pulsing signal can include a pulsing voltage signal and/or a pulsing current signal.

Figure 2:
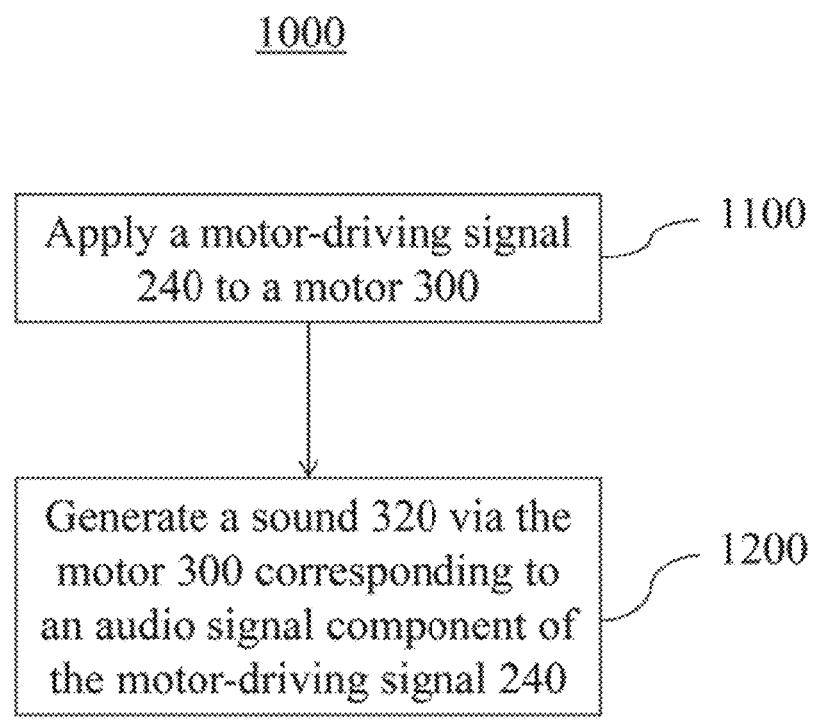
FIG. 2 is an exemplary top-level flow chart illustrating an embodiment of a method for generating sound using the motor of FIG. 1.

FIG. 2 is an exemplary top-level flow chart illustrating an embodiment of a method 1000 for generating sound using the motor 300 of FIG. 1. According to FIG. 2, the motor-driving signal 240 is applied, at 1100, to the motor 300. The motor controller 200 (shown in FIG. 1) can apply the motor-driving signal 240 to the motor 300.

For example, the motor controller 200 can be coupled with the motor 300 via a motor-driving signal line 230 (shown in FIG. 6), and/or any other suitable driving circuits (not shown). The motor 300 can include a stator coil (shown in FIGS. 8-12). A current passing through the stator coil to generate a magnetic field. The motor-driving signal line 230 can be coupled with the stator coils. Therefore, apply the motor-driving signal 240 to the motor 300 can include transmitting the motor-driving signal 240 to the stator coils via the motor-driving signal line 230. The stator coils can generate the magnetic field according to the motor-driving signal 240.

As shown in FIG. 2, the motor 300 is enabled, at 1200, to generate the sound 320 corresponding to an audio signal component of the motor-driving signal 240. The motor-driving signal 240 can drive the motor 300 to generate a mechanical motion. The mechanical motion can pump sound waves into the medium surrounding the motor 300 and towards a human (not shown) and/or a wave-sensing instrument (not shown). When the sound 320 includes an audible sound within the limit of human hearing, a human ear can perceive the sound.

Figure 3:
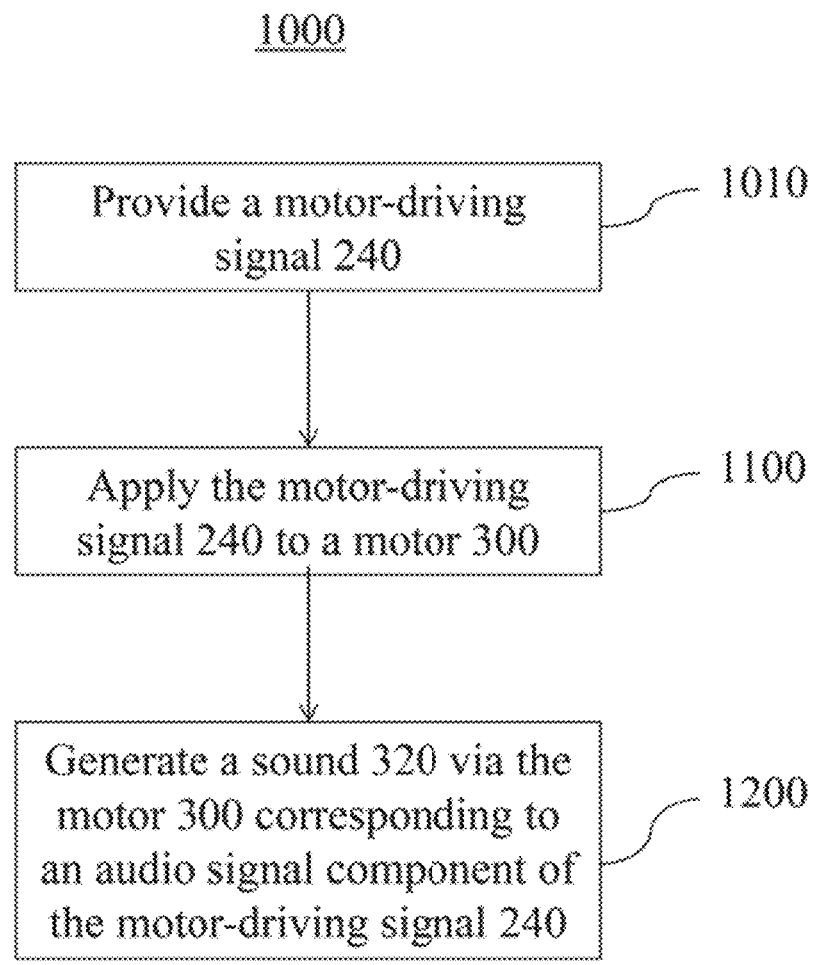
FIG. 3 is an exemplary top-level flow chart illustrating an alternative embodiment of the method of FIG. 2, wherein the motor-driving signal is provided.

FIG. 3 is an exemplary top-level flow chart illustrating an alternative embodiment of the method 1000 of FIG. 2, wherein the motor-driving signal is provided. According to FIG. 27, the motor-driving signal 240 can be provided, at 1010, in accordance with the audio signal. The motor controller 200 (shown in FIG. 1) can provide the motor-driving signal 240 using any suitable processes.

Figure 4:
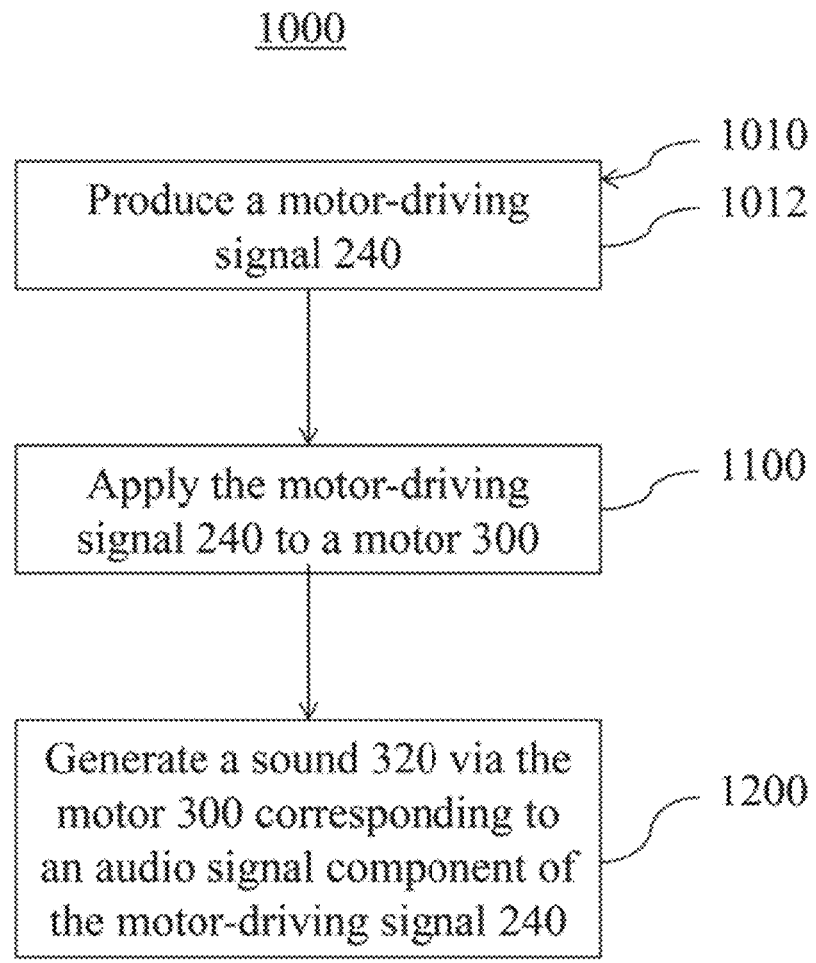
FIG. 4 is an exemplary top-level flow chart illustrating another alternative embodiment of the method of FIG. 2, wherein the method further comprises producing a motor-driving signal with an audio signal component.

FIG. 4 is an exemplary top-level flow chart illustrating another alternative embodiment of the method of FIG. 2, wherein the method further comprises producing the motor-driving signal 240 with an audio signal component. According to FIG. 4, the motor-driving signal 240 can be produced, at 1012, in accordance with the audio signal. In other words, providing the motor-driving signal 240 (shown in FIG. 3) can include producing the audio signal. For example, the motor controller 200 (shown in FIG. 1) can provide the motor-driving signal 240 using any suitable processes. Exemplary structures of the motor controller 200 are shown in FIGS. 14, 16-21, and/or 29.

Figure 5:
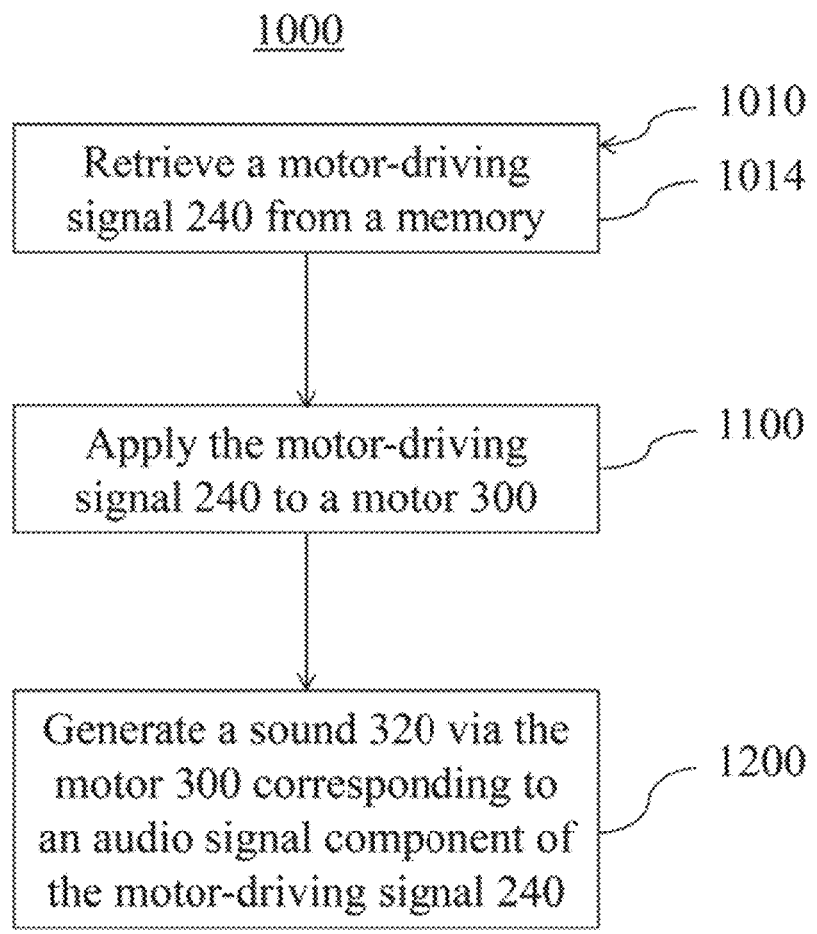
FIG. 5 is an exemplary top-level flow chart illustrating another alternative embodiment of the method of FIG. 2, wherein the motor-driving signal is retrieved from a memory.

FIG. 5 is an exemplary top-level flow chart illustrating another alternative embodiment of the method of FIG. 2, wherein the motor-driving signal 240 is retrieved from a memory. According to FIG. 5, the motor-driving signal 240 can be retrieved, at 1014, from a memory (not shown). In other words, providing the motor-driving signal 240 (shown in FIG. 3) can include retrieving the motor-driving signal 240 from a memory. For example, the motor controller 200 (shown in FIG. 1) can retrieve the motor-driving signal 240 from a memory 220 and/or a memory 420 (shown in FIG. 6).

The motor-driving signal 240 can be produced in accordance with an audio signal. For example, the motor-driving signal 240 can be produced by encoding the audio signal into a carrier signal. In some embodiments, the encoding can include modulating the carrier signal with the audio signal.

For example, the carrier signal can include a pulsing signal. The carrier signal can be modulated with the audio signal using any pulse wave modulation techniques. Exemplary modulate techniques can include pulse-width modulation (PWM) (or pulse-duration modulation), pulse-amplitude modulation (PAM), pulse-code modulation (PCM), pulse-density modulation (PDM), and/or pulse-position modulation (PPM).

Figure 6:
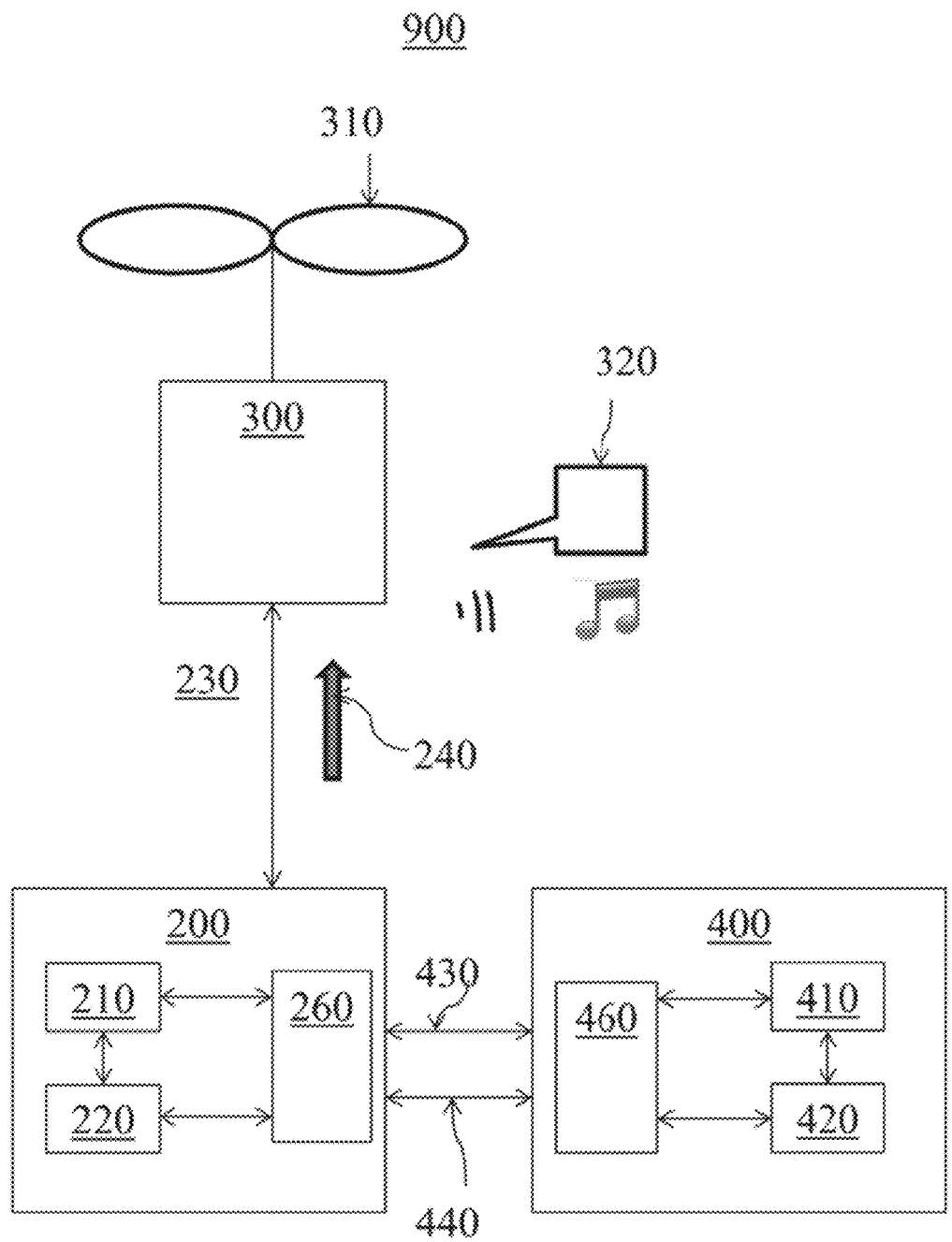
FIG. 6 is an exemplary diagram illustrating an alternative embodiment of the system of FIG. 1, wherein the motor is installed on a mobile platform.

FIG. 6 is an exemplary diagram illustrating an alternative embodiment of the system 100 of FIG. 1. The exemplary system 100 can installed on, and/or integrated with a mobile platform 900. Stated somewhat differently, the motor 300 and/or the motor controller 200 can be installed aboard the mobile platform 900. The system 100 thereby can be at least partially positioned aboard the mobile platform 900.

Examples of the mobile platform 900 can include, but are not limited to, bicycles, automobiles, trucks, ships, boats, trains, helicopters, aircraft, various hybrids thereof, and the like. In some embodiments, the mobile platform 900 is an unmanned aerial vehicle (UAV). Colloquially referred to as "drones," UAVs are aircraft without a human pilot (or operator) onboard the vehicle whose flight is controlled autonomously or by a remote pilot (or sometimes both). UAVs are now finding increased usage in civilian applications involving various aerial operations, such as data-gathering or delivery. The present systems and methods are suitable for many types of UAVs including, without limitation, quadcopters (also referred to a quadrotor helicopters or quad rotors), single rotor, dual rotor, trirotor, hexarotor, and octorotor rotorcraft UAVs, fixed wing UAVs, and hybrid rotorcraft-fixed wing UAVs.

As shown in FIG. 6, the motor controller 200 can optionally include a memory 220 coupled with the processor 210. Exemplary memory 220 can include, but is not limited to, random access memory (RAM), static RAM, dynamic RAM, read-only memory (ROM), programmable ROM, erasable programmable ROM, electrically erasable programmable ROM, flash memory, secure digital (SD) card, etc.). The memory 220 can be configured to store data files, and coded instructions. For example, the data files can include an audio file for storing the audio signal in a computer-readable format. The coded instructions can include instructions for operating the motor when executed by the processor 210.

The processor 210 can be configured to execute the coded instructions for implementing methods as disclosed herein. Although described as including a single memory 220 for purposes of illustration only, the motor controller 200 can include any suitable number of uniform and/or different memories 220.

The motor controller 200 can include a communication module 260 coupled with the processor 210 and/or the memory 220. The communication module 260 can include a digital communication interface and/or an analog communication interface. The communication module 260 can be configured to receive data and/or control signal from the motor controller 200 and/or to send a motor-control signal 240 to the motor 300. Further, the communication module 260 can include a transceiver, a transmitter and/or a receiver that can include radio frequency (or RF) circuitry or any other appropriate hardware and any appropriate software instructing the hardware for receiving and/or transmitting data via a wired or wireless connection with an electronic device. Although described as including a single communication module 260 for purposes of illustration only, the motor controller 200 can include any suitable number of uniform and/or different communication modules 260.

FIG. 6 shows the system 100 as further including a main controller 400. The main controller 400 can be configured to perform data acquisition, data processing, and any other functions and operations for controlling an operation of the mobile platform 900. The main controller 400 can be installed onboard the mobile platform 900. Additionally and/or alternatively, the main controller 400 include a remote controller (not shown) configured to control the mobile platform 900 remotely.

The main controller 400 can include a processor 410, a memory 420 coupled with the processor 410, and/or a communication module 460 coupled with the processor 410 and/or the memory 420. The communication module 460 can include a digital communication interface and/or an analog communication interface. The communication module 460 can be configured to transmit data and/or control signal to the motor controller 200. Further, communication interface 460 can include a transceiver, a transmitter and/or a receiver that can include RF circuitry or any other appropriate hardware and any appropriate software instructing the hardware for receiving and/or transmitting data via a wired and/or wireless connection with an electronic device. Advantageously, the communication interface 460 of the main controller 400 preferably is compatible with, and can communicate with, the communication module 260 of the motor controller 200.

Although shown and described as including a single processor 410, a single memory 420 and a single communication module 460 for purposes of illustration only, the main controller 400 can include any suitable number of uniform and/or different processors 410, any suitable number of uniform and/or different memories 420, and any suitable number of communication modules 460.

The main controller 400 can be coupled with the motor controller 200 via a control signal line 430 and/or a data communication line 440. FIG. 6 further illustrates the motor controller 200 as being coupled with the motor 300 via a motor-driving signal line 230. The motor-driving signal 240 can be transmitted to the motor 300 from the motor controller 200 via the motor-driving signal line 230. The motor-driving signal line 230, the control signal line 430 and/or the data communication line 440 can include any conventional wired and/or wireless communication input/output interface, circuit, and/or wiring.

Communication between the motor controller 200, the motor 300, and the main controller 400 can be wired and/or wireless. Further, although the motor controller 200 is illustrated in FIG. 6 as separate from the main controller 400, the motor controller 200 can be at least partially integrated with the main controller 400.

When the system 100 is installed on the mobile platform 900, the motor 300 can be configured to enable the mobile platform 900 to move. For example, the motor 300 can be coupled with a propulsion mechanism 310. The propulsion mechanism 310 can include any structure for creating a force leading to a movement of the mobile platform 900. For example, the propulsion mechanism 310 can include one or more propellers driven by the motor 300 to rotate for generating thrust for propelling the mobile platform 900. Therefore, by being coupled with the propulsion mechanism 310, the motor 300 can be configured to enable the mobile platform 900 to move.

In addition to enabling the mobile platform 900 to move, the motor 300 can be driven by the motor controller 200 to generate the sound 320. The sound 320 can include a sound wave in and/or out of the frequency range of human hearing, and can include one or more frequency components. The sound 320, for example, can include music, speech, or a combination thereof. Additionally and/or alternatively, exemplary sound 320 can include a sound produced by an animal, a machine, and/or a natural phenomenon (i.e., an animal sound, a machine sound, a natural sound), without limitation.

Additionally and/or alternatively, the system 100 can include any other machine or other mechanism for generating motion, not limited to the mobile platform 900. For example, the system 100 can include a clock, a timer, a dial indicator, a wind-up toy, a music box, and/or the like. The propulsion mechanism 310 can thus include one or more propellers and/or one or more gears driven by the motor 300 to generate the motion of the system 100.

Figure 7:
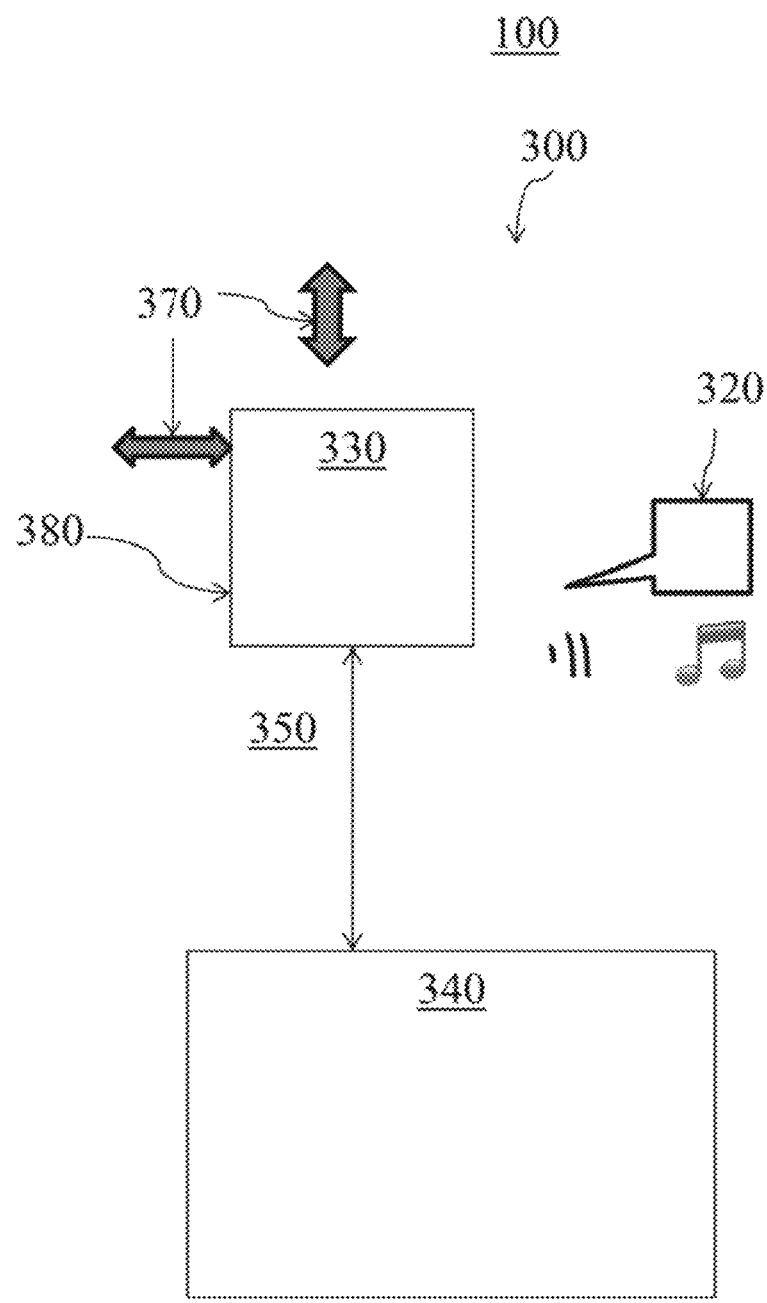
FIG. 7 is an exemplary diagram illustrating an embodiment of the motor of FIG. 1.

FIG. 7 is an exemplary diagram illustrating an embodiment of the motor 300 of FIG. 1. FIG. 7 illustrates the motor 300 as including a movable device 330 and/or a stationary device 340 coupled with the movable device 330 via an interaction 350. The interaction 350 can be generated and/or adjusted by the motor-driving signal 240. The interaction 350 can include a mechanical, electric, magnetic, optical, chemical, and/or biological force that is configured to generate a motion of the movable device 330.

The interaction 350 can enable the movable device 330 to be located at an equilibrium position 380 relative to the stationary device 340. Further, the interaction 350 can be generated and/or changed via the motor-driving signal 240 (shown in FIG. 1) from the motor controller 200 (shown in FIG. 1). The interaction 350 can be generated and/or changed, for example, in such a way as to generate a vibration 370 of the movable device 330 relative to the equilibrium position 380. In other words, the motor controller 200 can be configured to vibrate the movable device 330 relative to the equilibrium position 380 based upon the motor-driving signal 240. The vibration can be directed along one or more axes of the movable device 330 (or motor 300).

Figure 8:
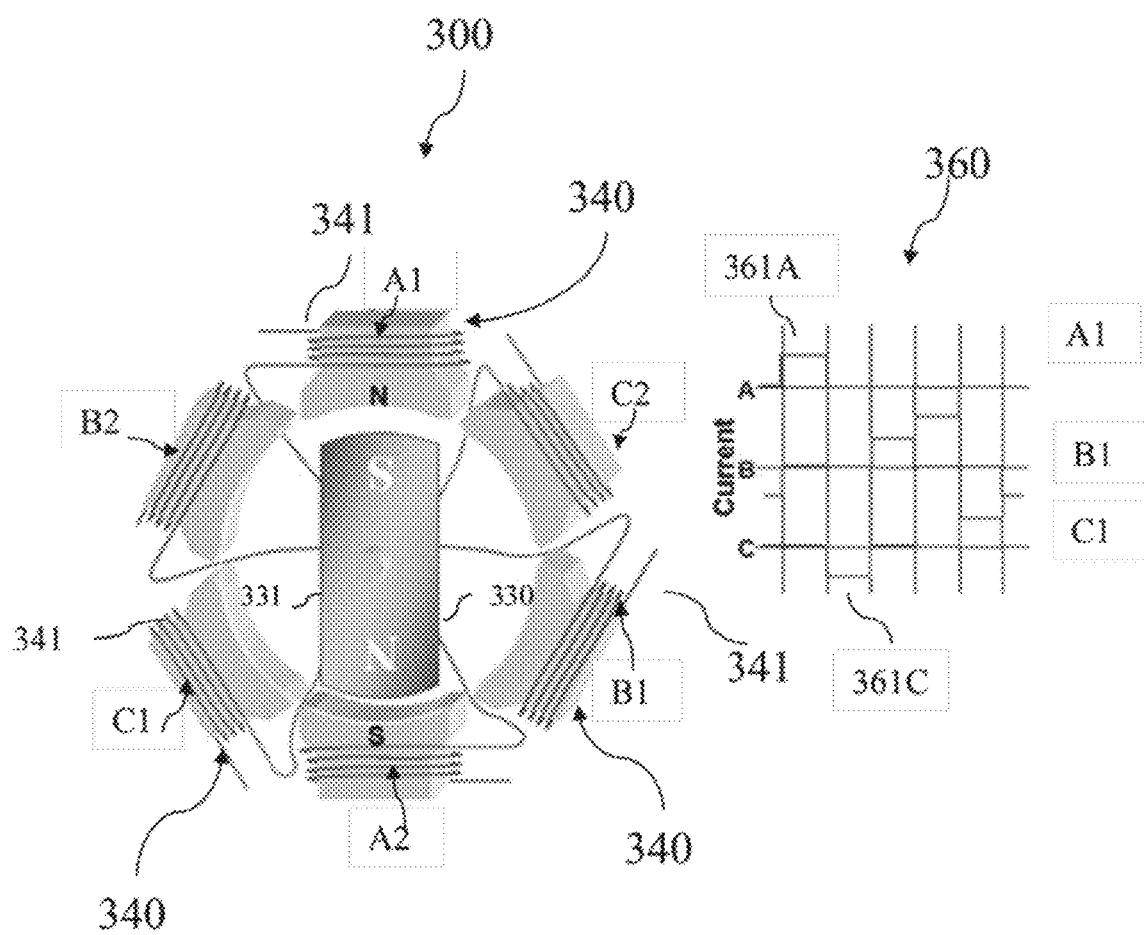
FIG. 8 is an exemplary detail drawing illustrating an alternative embodiment of the motor of FIG. 1, wherein the motor is configured to generate a rotating motion.

To further illustrate the interaction 350, FIG. 8 shows an exemplary detail drawing illustrating an alternative embodiment of the motor 300 of FIG. 1. The motor 300 can be configured to generate a rotating motion. For illustrative purposes, FIG. 8 shows the motor 300 as a three-phase brushless direct current (BLDC) motor. However, the motor 300 is not limited to the three-phase BLDC motor.

In FIG. 8, the stationary device 340 is shown as including a stator 341. The stator 341 can include three stator coil pairs A1/A2, B1/B2, C1/C2. The stator coil pair A1/A2 includes coils A1, A2. The stator coil pair B1/B2 includes coils B1, B2. The stator coil pair C1/C2 includes coils C1, C2. Each of the stator coil pairs A1/A2, B1/B2, C1/C2 can function as a magnetized pole pair when an electric current passes the coil(s) A1, A2, B1, B2, C1, C2. Optionally, each of the coils A1, A2, B1, B2, C1, C2 can wrap around a core of soft ferromagnetic material such as steel, to enhance a magnetic field produced by the coil.

The movable device 330 can include a rotor 331 rotatable relative to the stator 341. The rotor 331 can include at least one magnet, such as a permanent magnet. Further, although FIG. 8 shows the motor 300 having an inner rotor, i.e., the rotor 331 being surrounded by the stator 341, the motor 300 can additionally and/or alternatively have an outer rotor. The outer rotor can refer to a rotor that surrounds a stator. When the motor 300 has the outer rotor, the disclosed method, apparatus and/or system can be equivalently and/or similarly implemented.

Although FIG. 8 illustrates the moveable device 330 as being a rotor, the moveable device 330 can include a movable component that can generate a motion other than rotation. For example, alternatively and/or additionally, the motor 300 can include a linear motor. The movable device 330 can generate a linear motion.

A pulsed DC current can be provided to the stator coil pairs A1/A2, B1/B2, C1/C2 at a synchronous speed (or rate) to create a rotating magnetic field. The magnetic field of each stator coil pair can be generated at synchronous speed.

For example, as shown in an electric current diagram 360 in FIG. 8, the stator coil pair A1/A2 can be first provided with a DC pulse 361A, which magnetizes the coil A1 as a north pole and the coil A2 as a south pole, drawing the rotor 331 into an initial position. As the rotor 331 passes the first magnetized pole pair, in this case the stator coil pair A1/A2, the current/voltage to the coil pair A1/A2 can be switched off. The next stator coil pair C1/C2 can be provided with a DC pulse 361C causing the coil C1 to be magnetized as a south pole and the coil C2 to be a north pole. The rotor 331 can then rotate clockwise to align with the stator coil pair B1/B2. By pulsing the stator coil pairs A1/A2, B1/B2, C1/C2 in sequence, the rotor 331 can continue to rotate clockwise to keep being aligned with the stator coil pairs A1/A2, B1/B2, C1/C2. The speed (or rate) of rotation can be controlled by the frequency of the pulse and the torque by the current and/or voltage of the pulse.

When no electric signal is applied to the stator coil pairs A1/A2, B1/B2, C1/C2, the rotor 331 can assume a predetermined orientation relative to the stator 341 and may be in alignment with the stator 341 and/or out of alignment with the stator 341. However, when a constant magnetic field is formed, the rotor 331 can be aligned with the constant magnetic field. A position of the rotor 331 that aligns with the constant magnetic field can be referred to as the equilibrium position 380 (shown in FIG. 7) of the rotor 331.

Further, when the direction of an effective magnetic field oscillates relative to the direction of the constant magnetic field, the rotor 331 can vibrate relative to the equilibrium position 380.

Figure 9:
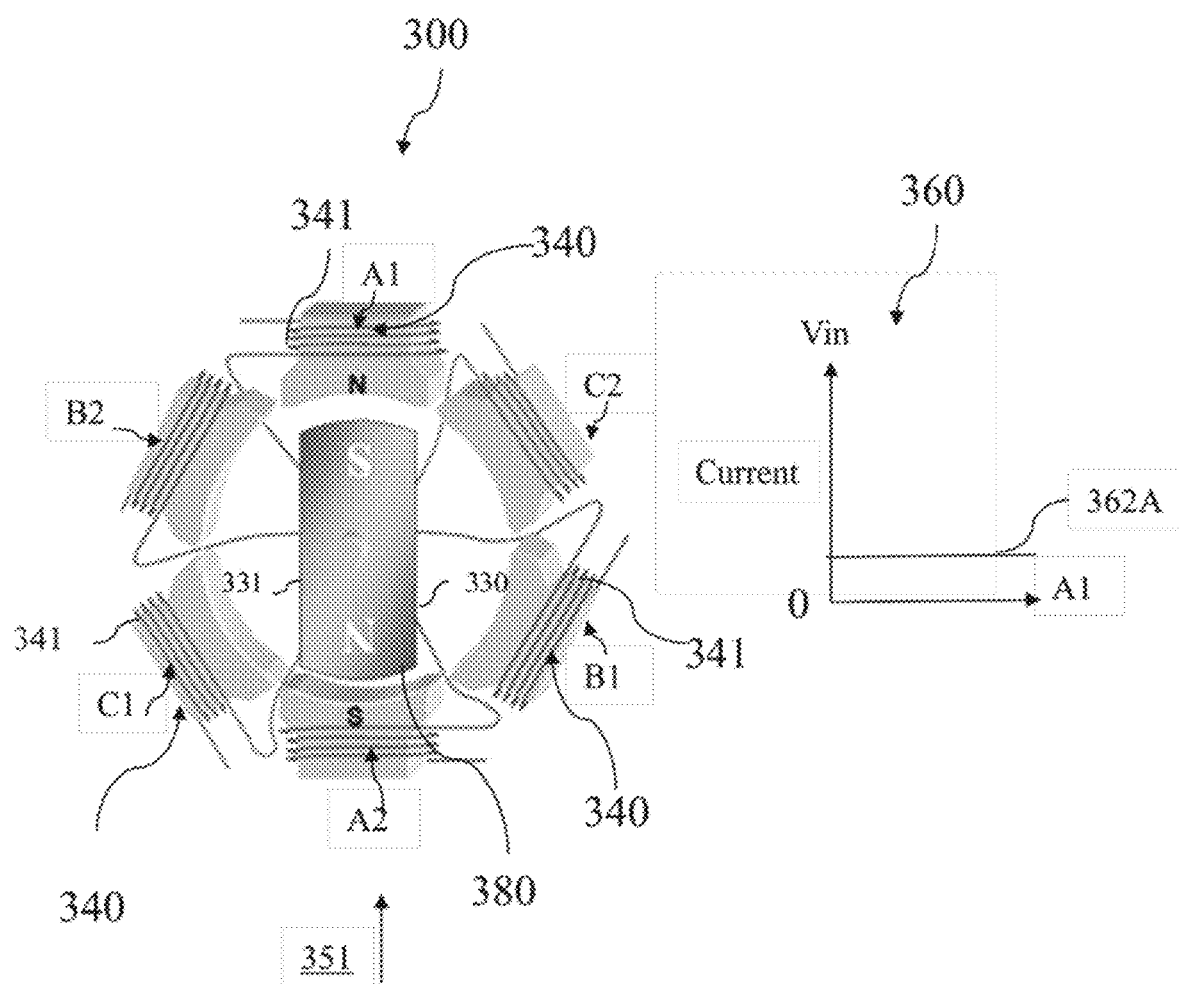
FIGS. 9-10 are exemplary detail drawings illustrating other respective alternative embodiments of the motor of FIG. 1, wherein a rotor of the motor is configured to assume an equilibrium position.

FIG. 9 is an exemplary detail drawing illustrating another alternative embodiment of the motor 300 of FIG. 1. FIG. 9 illustrates the rotor 331 of the motor 300 as assuming the equilibrium position 380.

In FIG. 9, the stator coil pair A1/A2 can be first provided with a DC signal 362A, which magnetizes the coil A1 as a north pole and the coil A2 as a south pole. The DC signal 362A provided to the stator coil pair A1/A2 can remain constantly on. No signal is provided to the stator coil pairs B1/B2, C1/C2. Thus, the constant magnetic field 351 can be established, and the rotor 331 can assume the equilibrium position 380 in order to align with the constant magnetic field 351. In the example shown in FIG. 9, the rotor 331 is aligned with the stator coil pair A1/A2.

Figure 10:
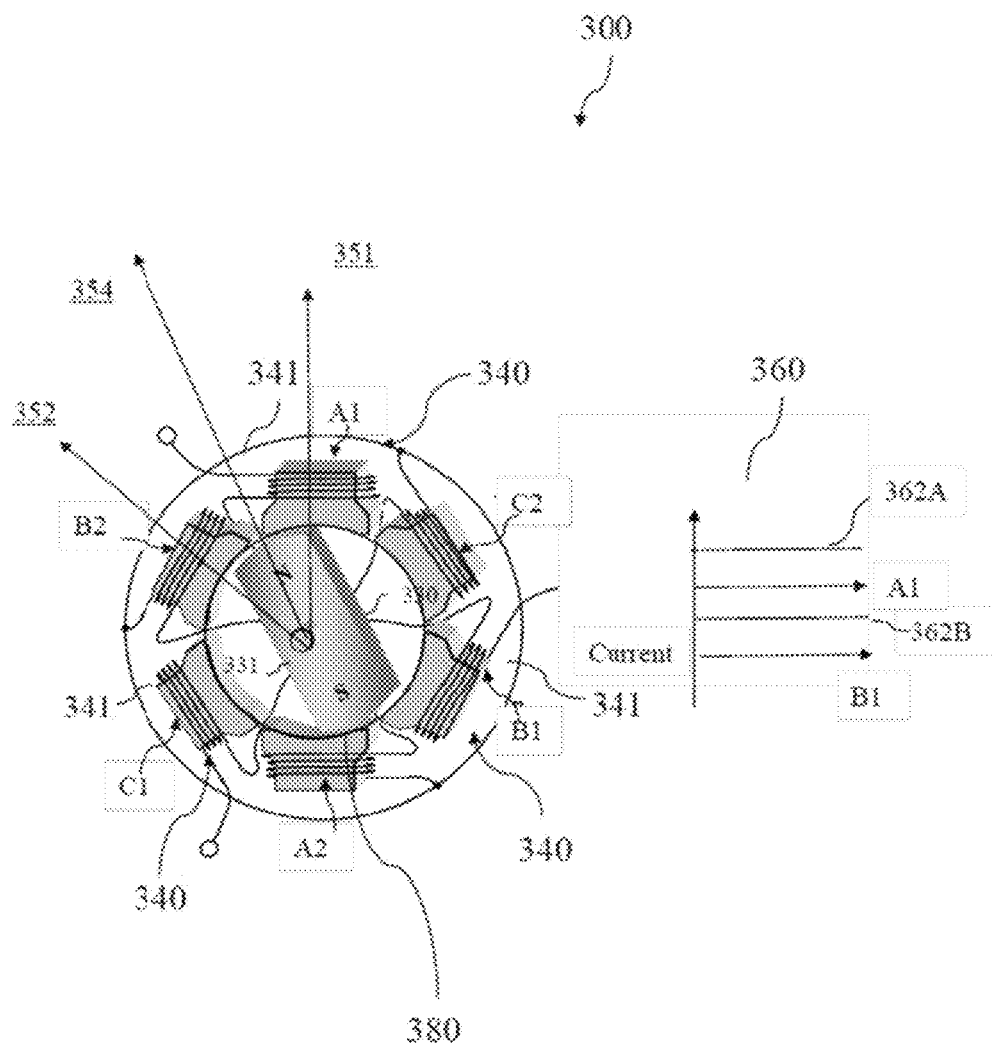

FIG. 10 is an exemplary detail drawing illustrating another alternative embodiment of the motor 300 of FIG. 1. FIG. 10 illustrates the rotor 331 of the motor 300 as assuming the equilibrium position 380.

In FIG. 10, in addition to a first DC signal 362A provided to the stator coil pair A1/A2, a second DC signal 362B can be provided to the stator coil pair B1/B2. Magnetic fields 351, 352 respectively formed by the stator coil pair A1/A2 and the stator coil pair B1/B2 can sum into a constant magnetic field 354. The rotor 331 can assume the equilibrium position 380 in order to align with the constant magnetic field 354. In the example shown in FIG. 7, the rotor 331 is aligned halfway between the stator coil pair A1/A2 and the stator coil pair B1/B2.

Although not shown in FIGS. 9-10, a third DC signal can further be applied to the respective stator coil pair C1/C2. Therefore, different and/or uniform DC signals can be applied to the respective stator coil pairs A1/A2, B1/B2, C1/C2, to control the rotor 331 to assume an equilibrium position 380 corresponding to the DC signals, without limitation.

Figure 11:
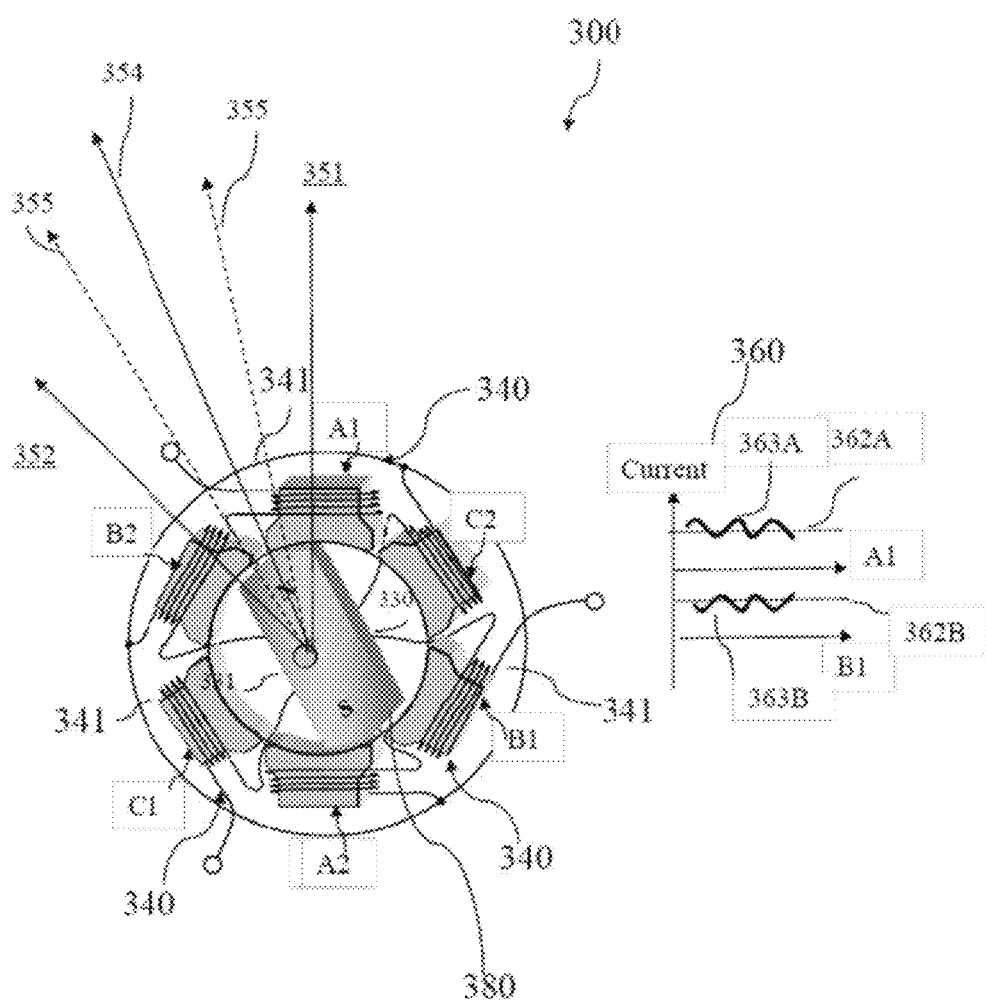
FIGS. 11-12 are exemplary detail drawings illustrating still other respective alternative embodiments of the motor of FIG. 1, wherein the motor is configured to generate a vibrating motion.

FIG. 11 is an exemplary detail drawing illustrating another alternative embodiment of the motor 300 of FIG. 1, wherein the motor 300 is configured to generate a vibrating motion. In FIG. 11, an oscillating signal 363A is superimposed on, and/or combined with, the first DC signal 362A. Further, the oscillating signal 363A can be inverted to form an oscillating signal 363B. The oscillating signal 363B can be superimposed on, and/or combined with, the second DC signal 362B and in synchronization with the oscillating signal 363A. Thus, the magnetic fields formed by the stator coil pair A1/A2 and the stator coil pair B1/B2 can sum into an effective magnetic field 355.

The directions of magnetic fields respectively formed by the stator coil pair A1/A2 and the stator coil pair B1/B2 can be different. Further, a difference between magnitudes of the magnetic fields respectively formed by the stator coil pair A1/A2 and the stator coil pair B1/B2 can oscillate between a negative value and a positive value. The direction of the effective magnetic field 355 can thus oscillate relative to the direction of the constant magnetic field 354. Accordingly, the rotor 331 can vibrate relative to the equilibrium position 380.

Directions and magnitude of magnetic fields and signals in FIGS. 8-11 are exemplary only. Magnitude and/or polarity of the oscillating signals 363A, 363B can be uniform and/or different. Magnitude and/or polarity of the DC signals 362A, 362B can be uniform and/or different. As indicated in FIG. 11, the direction of the effective magnetic field 355 can oscillate relative to the direction of the constant magnetic field 354.

Under the effective field 355, the rotor 331 can waver circumferentially (i.e., counter-clockwise and/or clockwise). For illustrative purposes, FIG. 11 shows the effective field 355 distributing on both sides of the constant magnetic field 354. However, the effective field 355 can be located on one side of the constant magnetic field 354. Position of the effective field 355 relative to the constant magnetic field 354 can be adjusted based on magnitude and/or polarity of the signals 363A, 363B, 362A, 362B. The constant magnetic field 354 can determine the equilibrium position 380. Accordingly, the rotor 331 "oscillating relative to the equilibrium position 380" can refer to the rotor 331 oscillating between two positions on different sides and/or uniform sides of the constant magnetic field 354.

Additionally and/or alternatively, under the effective field 355, the rotor 331 can vibrate in a radial direction, i.e., in a direction of the effective field 355. The magnitude of the effective field 355 at a point in time can vary based on magnitude and/or polarity of the signals 363A, 363B, 362A, 362B at the respective point in time. The rotor 331 can change shape and/or dimension due to magnetostriction. Magnetostriction can refer to a property of ferromagnetic materials of changing shape and/or dimensions during a process of magnetization. When the rotor 331 is made of a ferromagnetic material, the rotor 331 can change shape and/or dimension. Such change can result in a vibration of the rotor 331 in the radial direction, where the rotor 331 can be effectively pulled and pushed radially. In one example, when the rotor 331 is an outer rotor (not shown) fixed on a magnetic yoke (not shown), the rotor 331 can exert stress on the magnetic yoke. The rotor 331 and/or the magnetic yoke can be effectively pulled and pushed radially, resulting in a change in shape of the rotor 331 and/or the magnetic yoke.

Figure 12:
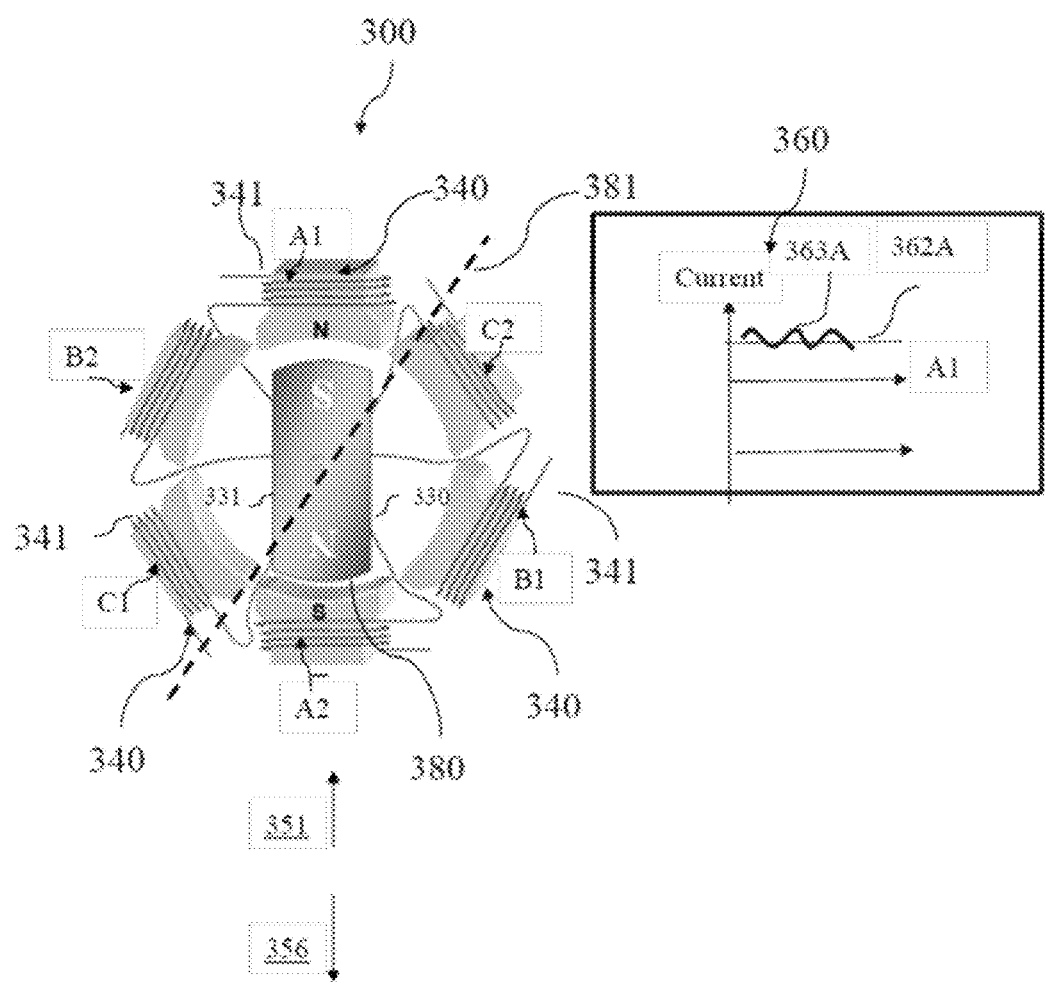

Although FIG. 11 illustrates the rotor 331 as being vibrated by applying an electrical signal to more than one stator coil pair, vibrating the rotor 331 does not necessarily need to involve more than one stator coil pair. For example, FIG. 12 is an exemplary detail drawing illustrating another alternative embodiment of the motor 300 of FIG. 1, wherein the motor 300 is configured to generate a vibrating motion. In FIG. 12, the oscillating signal 363A is superimposed on, and/or combined with, the DC signal 362A that is provided to the stator coil pair A1/A2. The oscillating signal 363A can be summed with the DC signal 362A to form a signal oscillating between a negative value and a positive value. Thus, even without a signal provided to the stator coil pairs B1/B2, C1/C2, the magnetic field formed by the stator coil pair A1/A2 can oscillate between the constant magnetic field 351 and an opposite magnetic field 356. Accordingly, the rotor 331 can vibrate relative to a direction between the constant magnetic field 351 and the opposite magnetic field 356. For example, the rotor 331 can vibrate relative to an equilibrium position 381 shown in FIG. 12. The position 381 is exemplary only and can have a different orientation from the orientation illustrated in FIG. 12.

Figure 13:
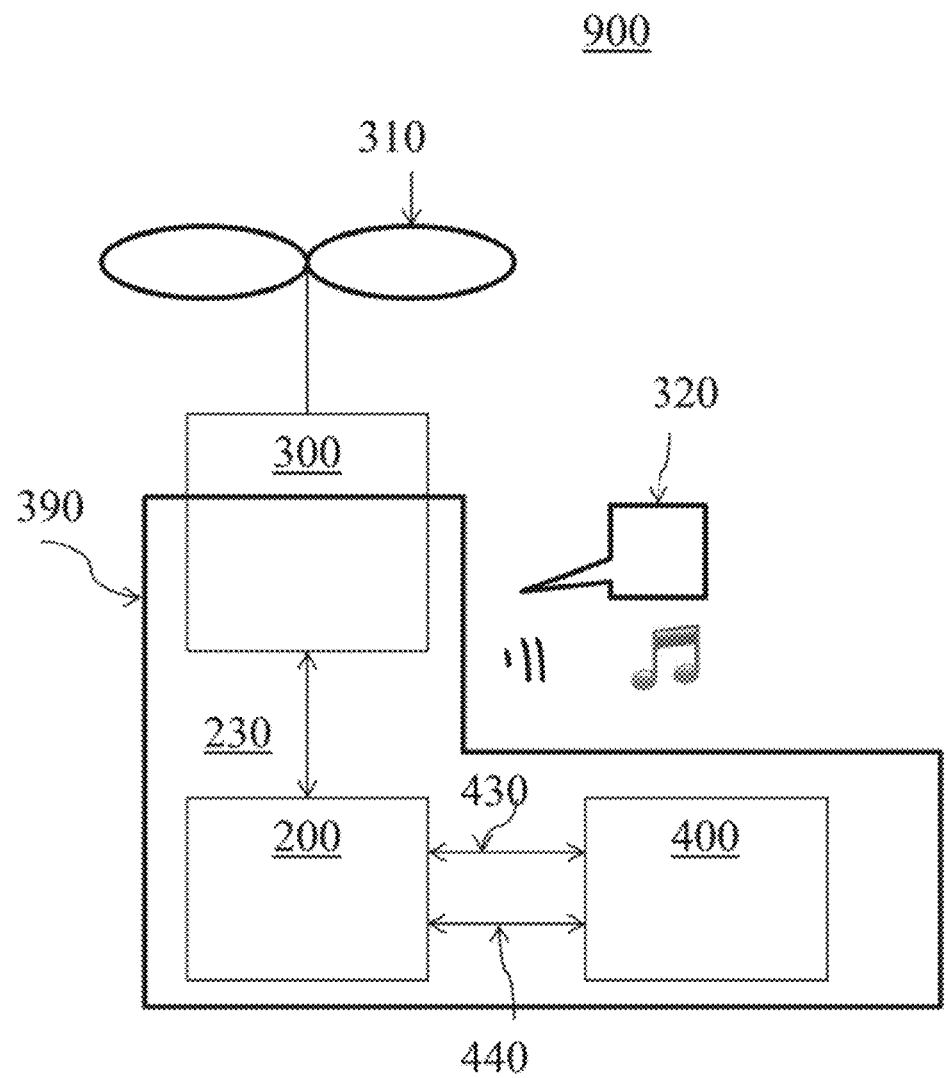
FIG. 13 is an exemplary diagram illustrating another alternative embodiment of the system of FIG. 1, wherein the system includes a motor casing that at least partially encloses a motor.

Therefore, the motor controller 200 can be configured to vibrate the rotor 331 relative to the equilibrium position 380 based upon the motor-driving signal 240. Further, the system 100 can include a sound amplifier (not shown) for amplifying the sound 320. An exemplary sound amplifier can include a motor casing or other enclosure surrounding the rotor 331 and/or the motor 300. FIG. 13 is an exemplary diagram illustrating another alternative embodiment of the system 100 of FIG. 1, wherein the system 100 includes a motor casing 390 that at least partially encloses the motor 300.

FIG. 13 illustrates the motor casing 390 as completely enclosing the main controller 400 and the motor controller 200. However, in certain examples, at least one of the main controller 400 and/or the motor controller 200 can be at least partially located outside the motor casing 390, without limitation. When the rotor 331 vibrates, the motor casing 390 can vibrate accordingly. The motor casing 390 may vibrate because the motor 330 is in mechanical connection with the motor casing 390. The vibration 370 (as in FIG. 7) of the rotor 331 thereby can mechanically drive the motor casing 390 to vibrate.

In certain cases, the motor 330 may be suspended within the motor casing 390 and surrounded by empty space in the motor casing 390 without being in directly and/or mechanically connected with the motor casing 390. The vibration 370 of the motor 300 may pump the surrounding medium, such as air, and thus exert a force for driving the motor casing 390 to vibrate.

The motor casing 390 can include a mounting base (not shown) by which the motor 300 can be coupled with the mobile platform 900. The motor casing 390 can achieve an effect similar to an effect of diaphragm and/or cone in a loudspeaker. That is, the vibration of the motor casing 390 can amplify the vibration 370 of the motor 300 and accordingly amplify the sound 320. Additionally and/or alternatively, the vibration 370 of the motor 300 may pump the surrounding medium, such as air, and thus exert a force for driving the stator 340 to vibrate.

The rotor 330 can vibrate based on the motor-driving signal 240 to generate the sound 320. To produce the motor-driving signal 240 for generating the sound 320, the motor controller 200 can encode the motor-driving signal 240 with the audio signal.

Figure 14:
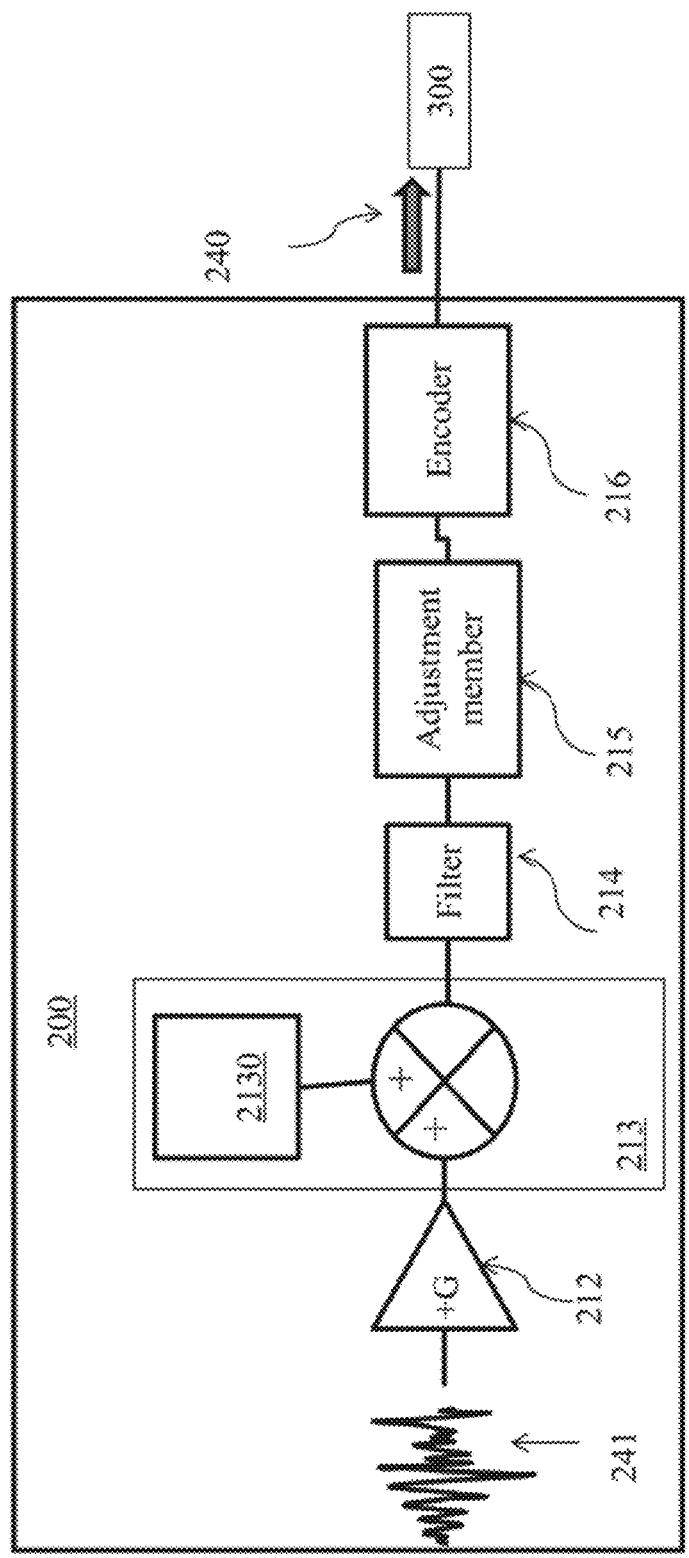
FIG. 14 is an exemplary diagram illustrating an embodiment of a motor controller for the motor of FIG. 1.
Figure 22:
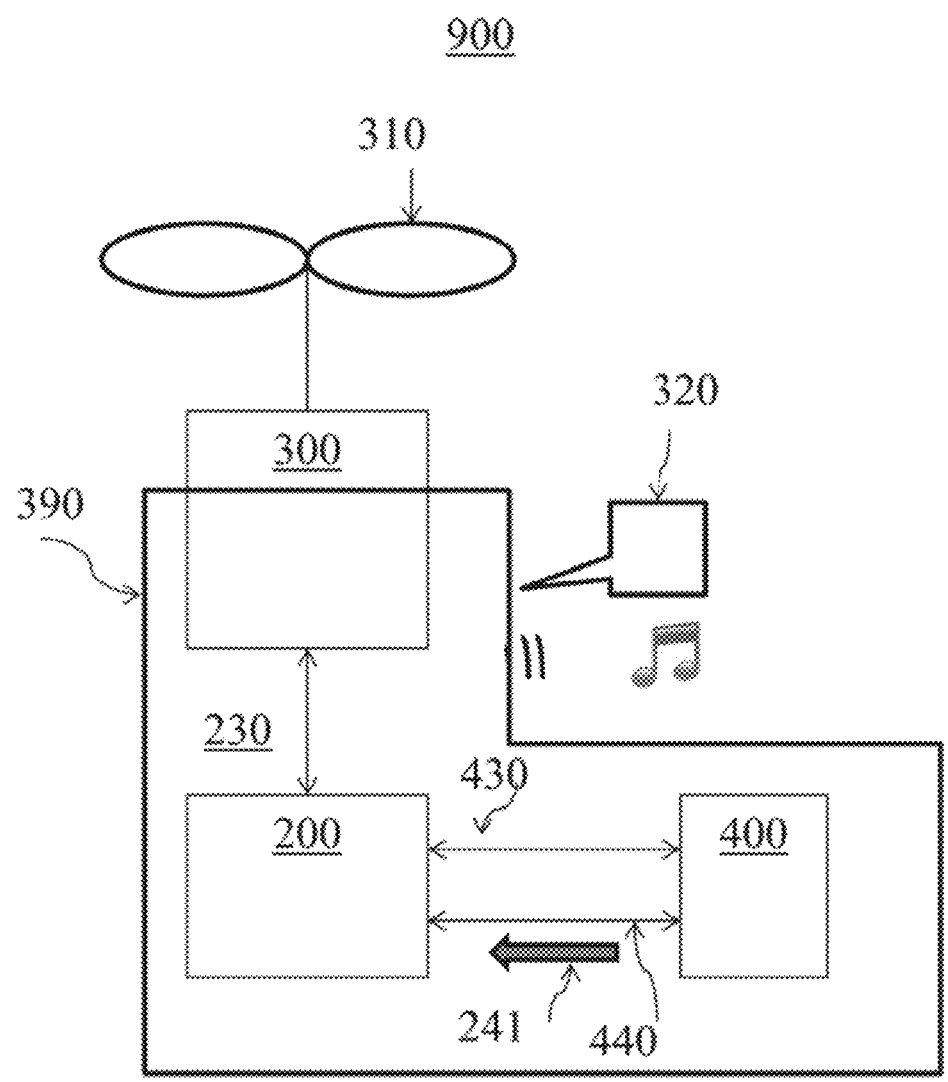
FIG. 22 is an exemplary diagram illustrating an alternative embodiment of the system of FIG. 6, wherein a main controller sends an audio signal to a motor controller.
Figure 23:
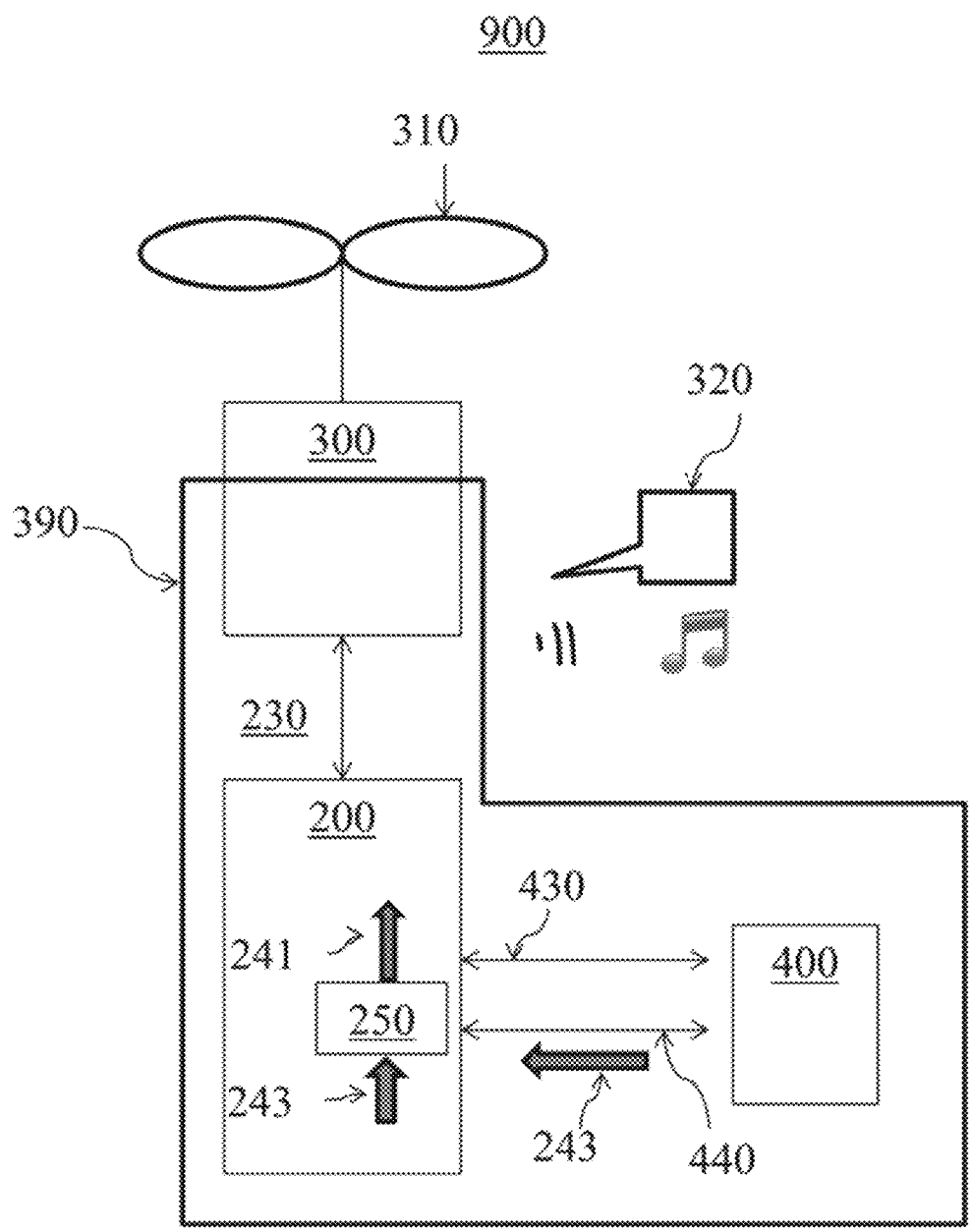
FIGS. 23-24 are exemplary diagrams illustrating respective alternative embodiments of the system of FIG. 1, wherein a motor controller of the system includes a decoder.

FIG. 14 is an exemplary diagram illustrating an embodiment of a motor controller for the motor 300 of FIG. 1. As shown in FIG. 14, the motor controller 200 can obtain the audio signal 241. Exemplary processes for obtaining the audio signal 241 are illustrated in FIGS. 22-23.

The motor controller 200 can include an optional amplifier 212. The amplifier 212 has a gain G for amplifying the audio signal 241. The amplifier 212 thereby enables an amplitude of the vibration 370 (shown in FIG. 7) of the motor 300 to be increased. Thus, a volume of the sound 320 likewise can be increased.

Additionally and/or alternatively, the motor controller 200 can include a DC signal unit 213 for superimposing a DC signal 2130 onto the audio signal 241. The DC signal 2130 can function as an offset configured to adjust the equilibrium position 380 (shown in FIGS. 9-10) of the rotor 330 relative to the stator 340.

The motor controller 200 can change and/or adjust a volume of the sound 320 by adjusting the equilibrium position 380 of the rotor 330 of the motor 300 relative to the stator 340 of the motor 330. Even when the audio signal 241 remains the same, a different equilibrium position 380 can result in a different torque exerted on the rotor 330 by the stator 340. Therefore, changing the equilibrium position 380 relative to the stator 340 can cause an amplitude of the vibration 370 (shown in FIG. 7) of the rotor 330 to change.

In certain embodiments, vibration of the rotor 330 may have a greater amplitude at an equilibrium position 380 aligned with the stator coil pair A1/A2 (as shown FIG. 9) than the equilibrium position 380 out of alignment with the stator coil pair A1/A2 (as shown FIG. 7). In other embodiments vibration of the rotor 330 may have a smaller amplitude at an equilibrium position 380 aligned with the stator coil pair A1/A2 (as shown FIG. 9) than the equilibrium position 380 out of alignment with the stator coil pair A1/A2 (as shown FIG. 7). How the equilibrium position 380 correlates with the amplitude may depend on specific design of the motor 300, and is not limited in the present disclosure. For example, the DC signals 362A, 362B can be respectively adjusted. When a volume of the sound 320 (shown in FIG. 7) reaches a maximum, the DC signals 362A, 362B are at a respective optimal value.

Additionally and/or alternatively, the motor controller 200 can include a filter 214. An exemplary filter 214 can include a low-pass filter configured to filter and/or remove a high frequency component of the audio signal 241. A cut-off frequency of the low-pass filter can be selected based on requirement of quality of the sound 320, without limitation. An exemplary cut-off frequency of the low-pass filter can be greater than 20 kHz, so high-pitch audible noise can be removed from the sound 320. The sound 320 can be softer to a human ear and have an improved tone quality.

Additionally and/or alternatively, the motor controller 200 can include an adjustment member 215 for processing the audio signal 241 in such a way as to improve the quality of the sound 320. The exemplary adjustment member 215 can include an equalizer for changing an amplitude of a selected frequency component of the audio signal 241, a reverb for creating an echo effect of the sound 320, and/or a bass booster for boosting a low frequency component of the audio signal 241.

Additionally and/or alternatively, the motor controller 200 can include an encoder 216. The encoder 216 can be configured to produce the motor-driving signal 240 modulated with the audio signal 241 for driving the motor 300 to generate the sound 320. An exemplary motor-driving signal 240 can include a pulsing signal. In certain embodiments, the pulsing signal can include a pulsing current signal having an amplitude ranging from 0.1 Amp to 0.5 Amp. In other embodiments, the pulsing signal can include a pulsing voltage signal having an amplitude ranging from 5 V to 100 V.

For generating the vibration 370 and/or enabling the rotor 330 to rotate, the motor controller 200 can produce the motor-driving signal 240 with certain suitable control parameters. In certain illustrative examples, the audio signal 241 can have a frequency range from 20 Hz to 20 kHz. The pulsing signal can have a frequency greater than 40 kHz, a pulse width (and/or duty cycle) ranging from 0% to 100%, and/or a resolution ranging from 8-bit to 14-bit.

For enabling the rotor 330 to rotate and/or driving the propulsion mechanism 310, the motor controller 200 can produce the motor-driving signal 240 with certain suitable control parameters. In certain illustrative examples, the pulsing signal can have a frequency ranging from 10 kHz to 40 kHz, a pulse width (and/or duty cycle) ranging from 0% to 100%, and/or a resolution ranging from 8-bit to 16-bit.

Figure 15:
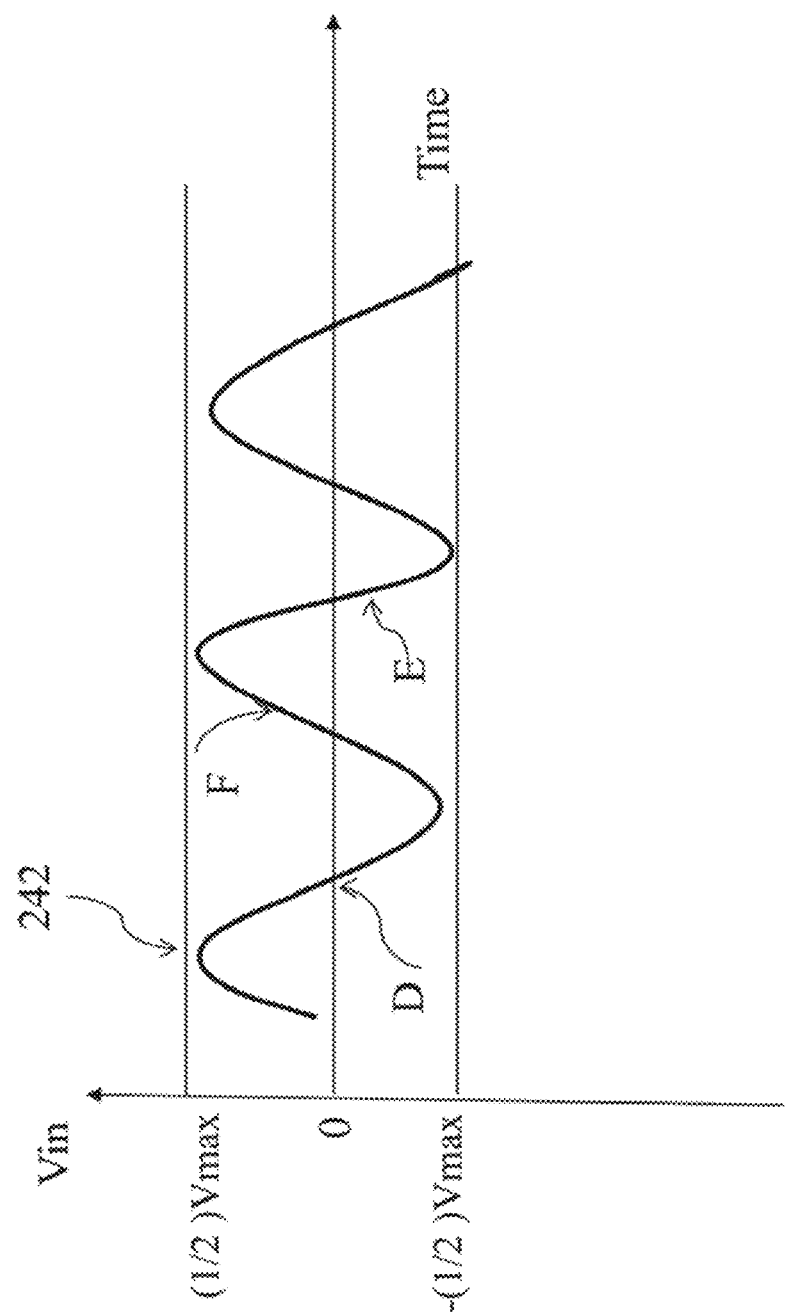
FIG. 15 is an exemplary diagram illustrating a waveform of a sinusoidal wave for modulating a pulsing signal using a motor controller of FIG. 14.

An exemplary technique for producing the motor-driving signal 240 modulated with the audio signal 241 can include pulse-width modulation (PWM). Pulse width modulation is a technique which can generate an output waveform (i.e., the motor-driving signal 240) that is switched on and off, resulting in the motor-driving signal 240 being high or low at a given time. The output waveform can then filtered by an inductance in the motor 300 to average the output waveform. The average of the motor-driving signal 240 can be changed by adjusting a duty cycle. The duty cycle can refer to a ratio of an ON portion time of the waveform compared to an OFF portion time of the waveform. An example of a sinusoidal wave to be encoded using PWM is shown in FIG. 15.

Any PWM method can be used for generating the motor-driving signal 240. In an exemplary PWM method, the duty cycle D can be calculated by:

$$\text{Duty cycle} = \frac{(V_{in} \times G + \text{Offset}) \times \text{Filter}}{V_{max}} + 50\% \qquad \text{Equation (1)}$$

where Vin is an input voltage of the audio signal 241, G is a gain of the amplifier 212, Offset is a value of the DC signal 2130, Filter is a gain of the filter 214, and Vmax is a peak-to-peak amplitude of the audio signal 241.

FIG. 15 is an exemplary diagram illustrating a waveform of a sinusoidal wave 242 for modulating a pulsing signal using the motor controller 200 of FIG. 14. For illustrative purposes, the example in FIG. 15 can have G=1, Offset=0, Filter=1. Thus, according to Equation (1), at point D, Vin=0, duty cycle=50%. At point E, −(½)Vmax<Vin<0, 0<duty cycle<50%. At point F, 0<Vin<(½)Vmax, 50%<duty cycle<100%. When the Offset is applied, for example, assuming the Offset=10% Vmax and Vin=0, duty cycle=60%.

Thus, at a certain time, a duty cycle of the pulsing signal can correspond to an input value of the sinusoidal wave. Using the PWM technique, the encoder 216 can produce the motor driving signal 240 in such a way that, at any time, a duty cycle of the motor-driving signal 240 can correspond to an input value of the audio signal inputted into the encoder 216.

Figure 16:
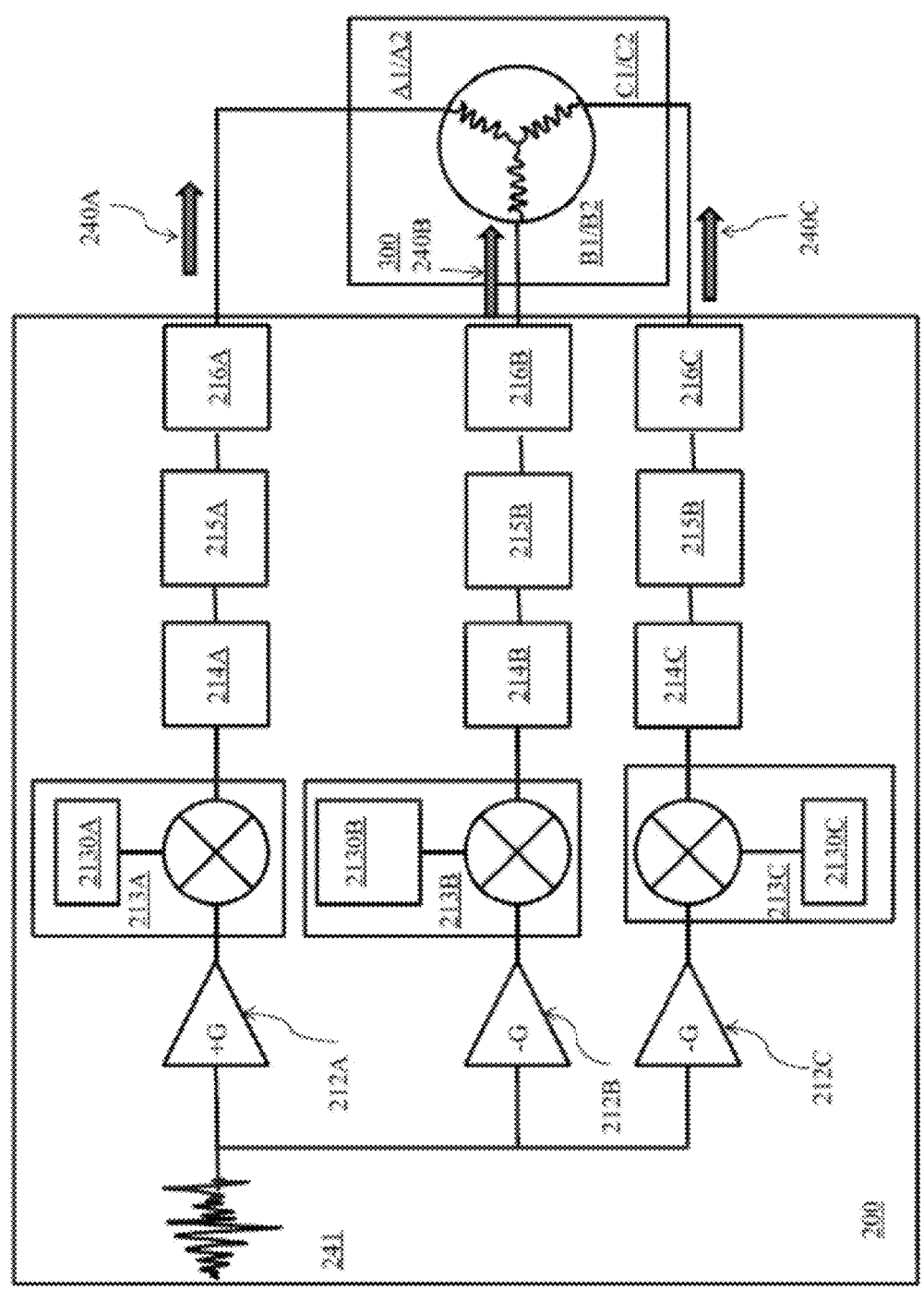
FIGS. 16-21 are exemplary detail diagrams illustrating respective alternative embodiments of the motor controller of FIG. 14, wherein the motor controller produces one or more motor-driving signals.

When the motor 300 includes a three-phase brushless DC motor (shown in FIGS. 8-12), the motor-driving signal 240 can be respectively provided to one or more of the three stator coil pairs A1/A2, B1/B2, C1/C2. FIG. 16 is an exemplary detail diagram illustrating an alternative embodiment of the motor controller 200 of FIG. 14. FIG. 16 shows the motor controller 200 as producing motor-driving signals 240A, 240B, 240C to feed to the stator coil pairs A1/A2, B1/B2, C1/C2, respectively. The motor controller 200 can include amplifiers 212A, 212B, 212C, DC signal units 213A, 213B, 213C, filters 214A, 214B, 214C, adjustment members 215A, 215B, 215C, and encoders 216A, 216B, 216C. The DC signal units 213A, 213B, 213C can be used for respectively superimposing DC signals 2130A, 2130B, 2130C to the audio signal 241.

As shown in FIG. 16, the amplifiers 212B and/or 212C can have a gain of −G, which has an opposite sign from the gain +G of the amplifier 212A. Thus, the stator coil pairs A1/A2, B1/B2, C1/C2 can create a summed magnetic field for vibrating the rotor 331 (shown in FIG. 8).

Figure 17:
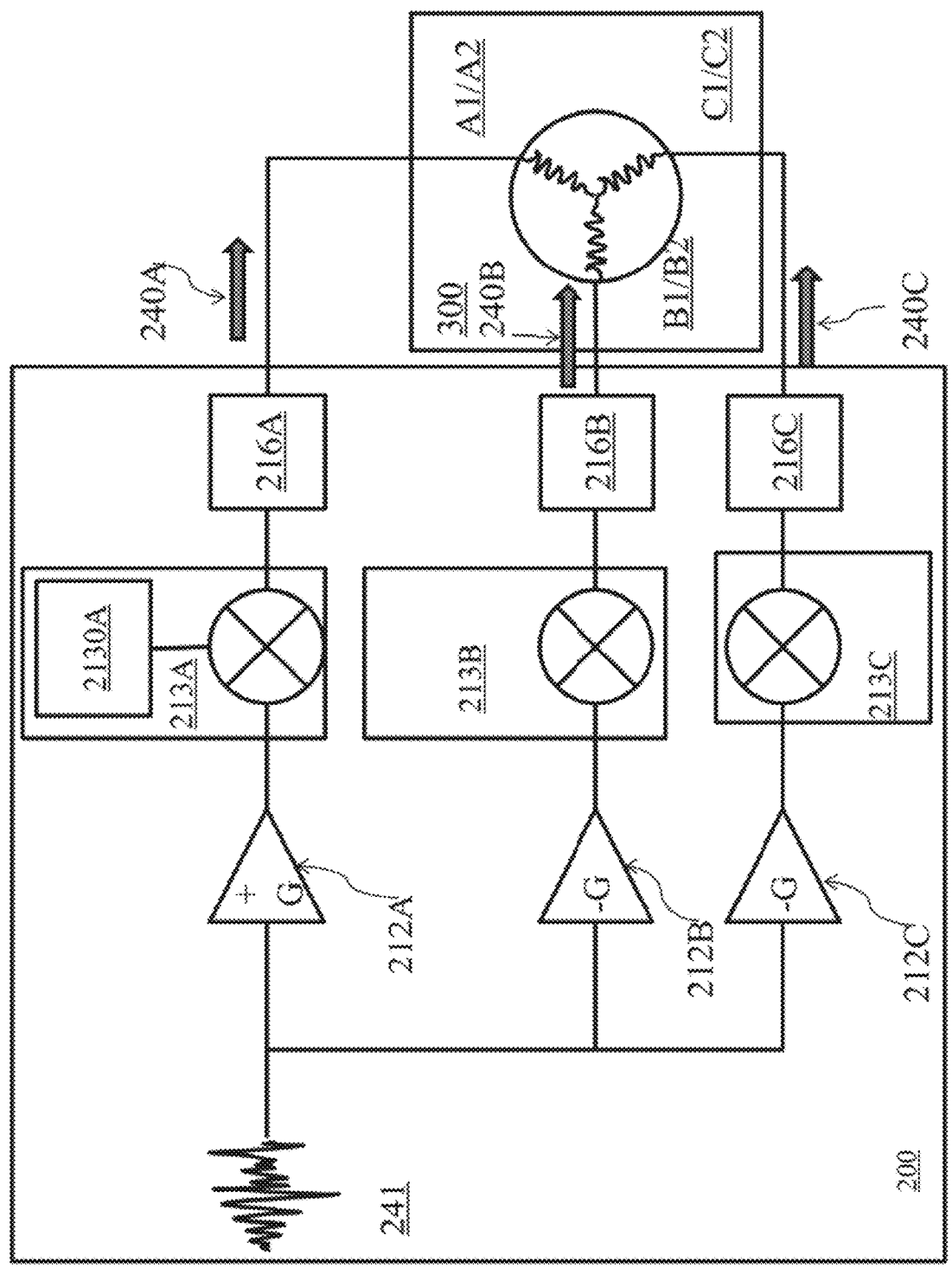

FIG. 17 is an exemplary detail diagram illustrating an alternative embodiment of the motor controller 200 of FIG. 14. FIG. 17 shows the filters 214A, 214B, 214C and the adjustment members 215A, 215B, 215C as being omitted from the motor controller 200. The motor-driving signals 240A, 240B, 240C can be produced and provided to the stator coil pairs A1/A2, B1/B2, C1/C2, respectively, to generate the sound 320 (shown in FIG. 7).

Figure 18:
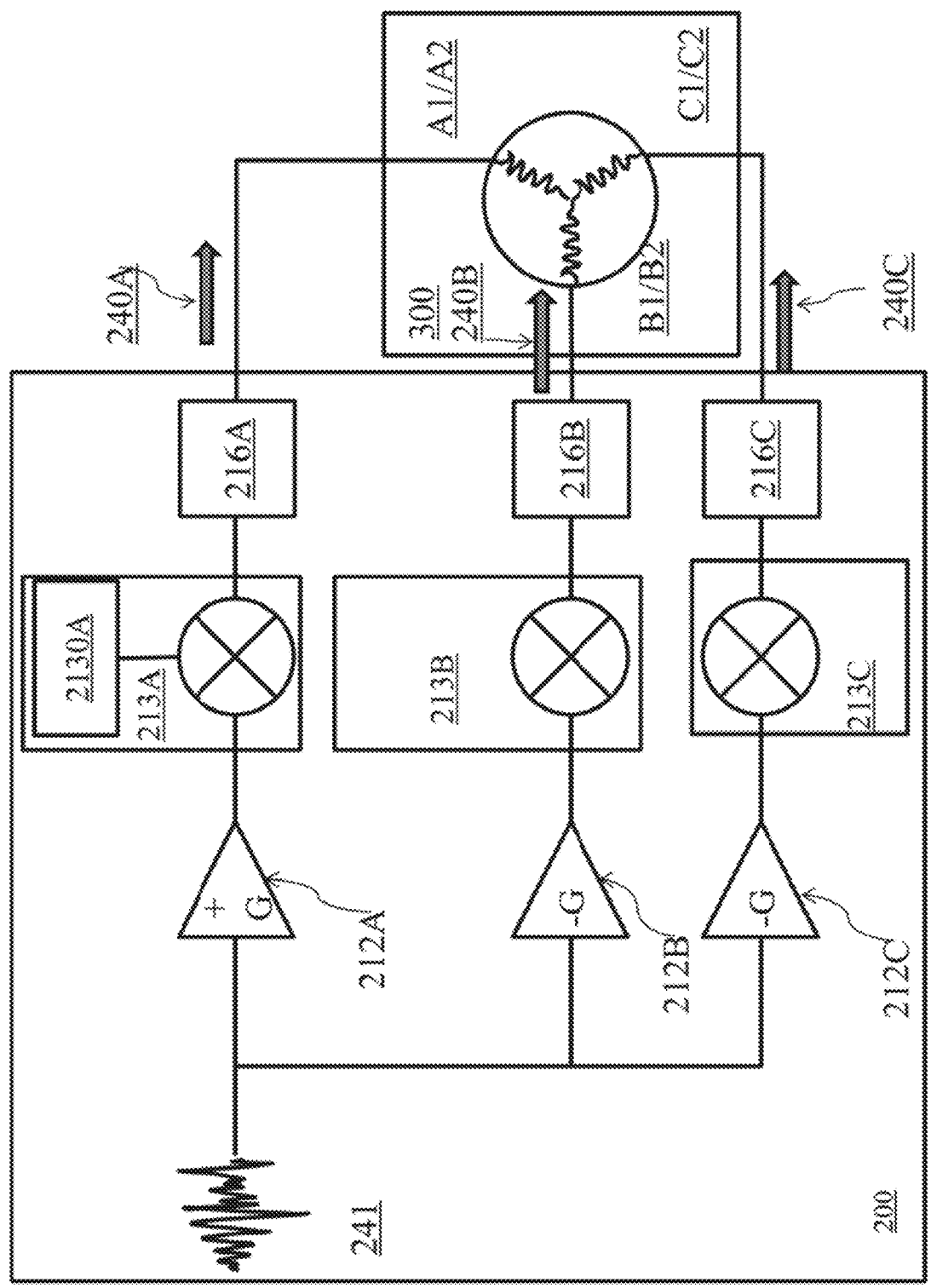

FIG. 18 is an exemplary detail diagram illustrating an alternative embodiment of the motor controller 200 of FIG. 14. FIG. 18 shows the motor controller 200 as applying the DC signal 2130A to the stator coil pairs A1/A2. The DC signals 2130B, 2130C applied to the stator coil pairs B1/B2, C1/C2 can be omitted. In this case, the rotor 330 may have the equilibrium position 380 aligned with the stator coil pair A1/A2 (shown in FIG. 9).

Figure 19:
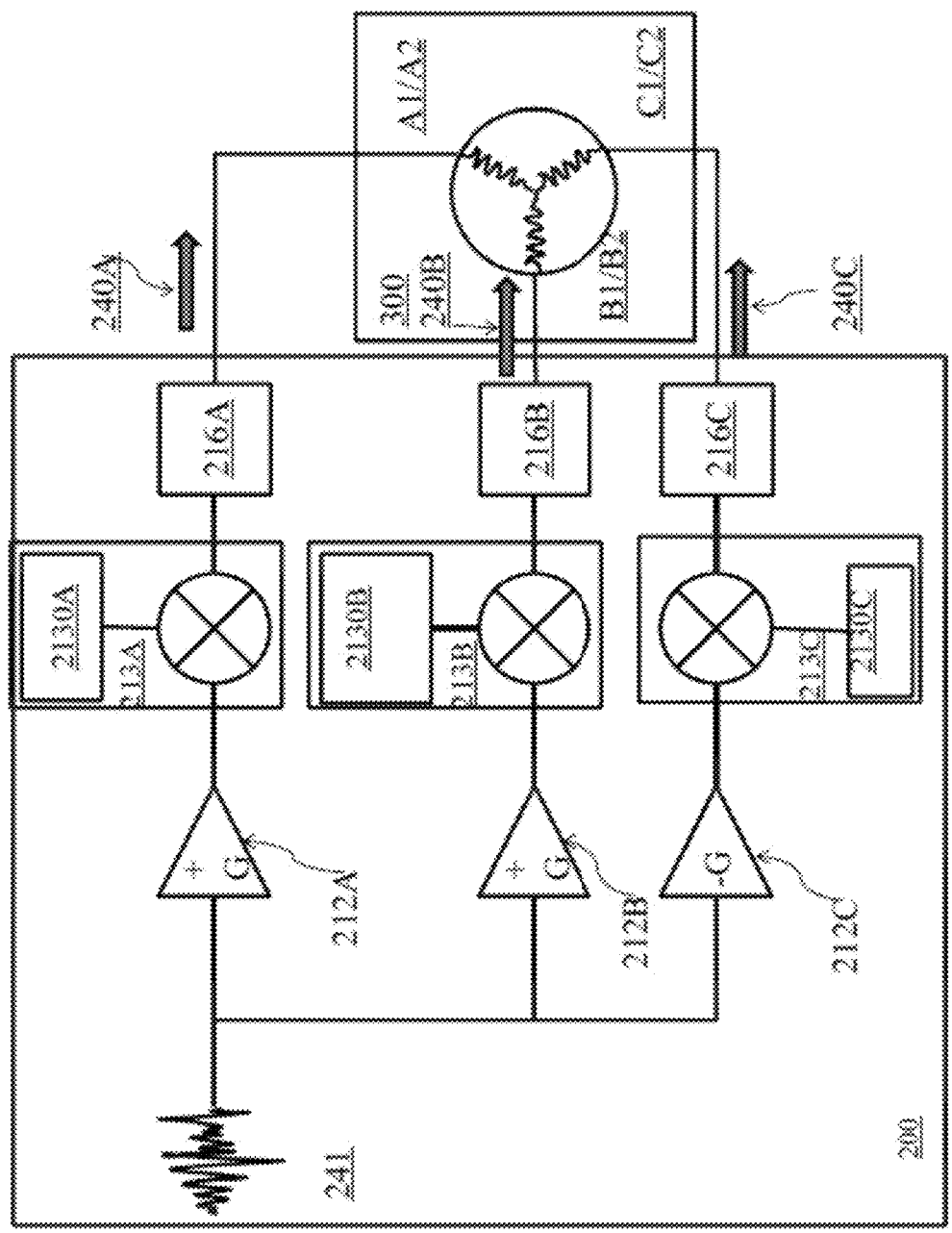

FIG. 19 is an exemplary detail diagram illustrating another alternative embodiment of the motor controller 200 of FIG. 1. FIG. 19 shows the amplifier 212A and/or the amplifier 212B as having a positive gain +G. The amplifier 212C can have a negative gain −G. In such a case, the audio signal can be inverted by the amplifier 212C. Thus, the audio signal 241 can be inverted before being provided to the stator coil pairs C1/C2. The rotor 330 can thus vibrate according to the difference between the magnetic field formed by the stator coil pair C1/C2 and the sum of the magnetic fields generated by the stator coil pairs A1/A2, B1/B2.

Figure 20:
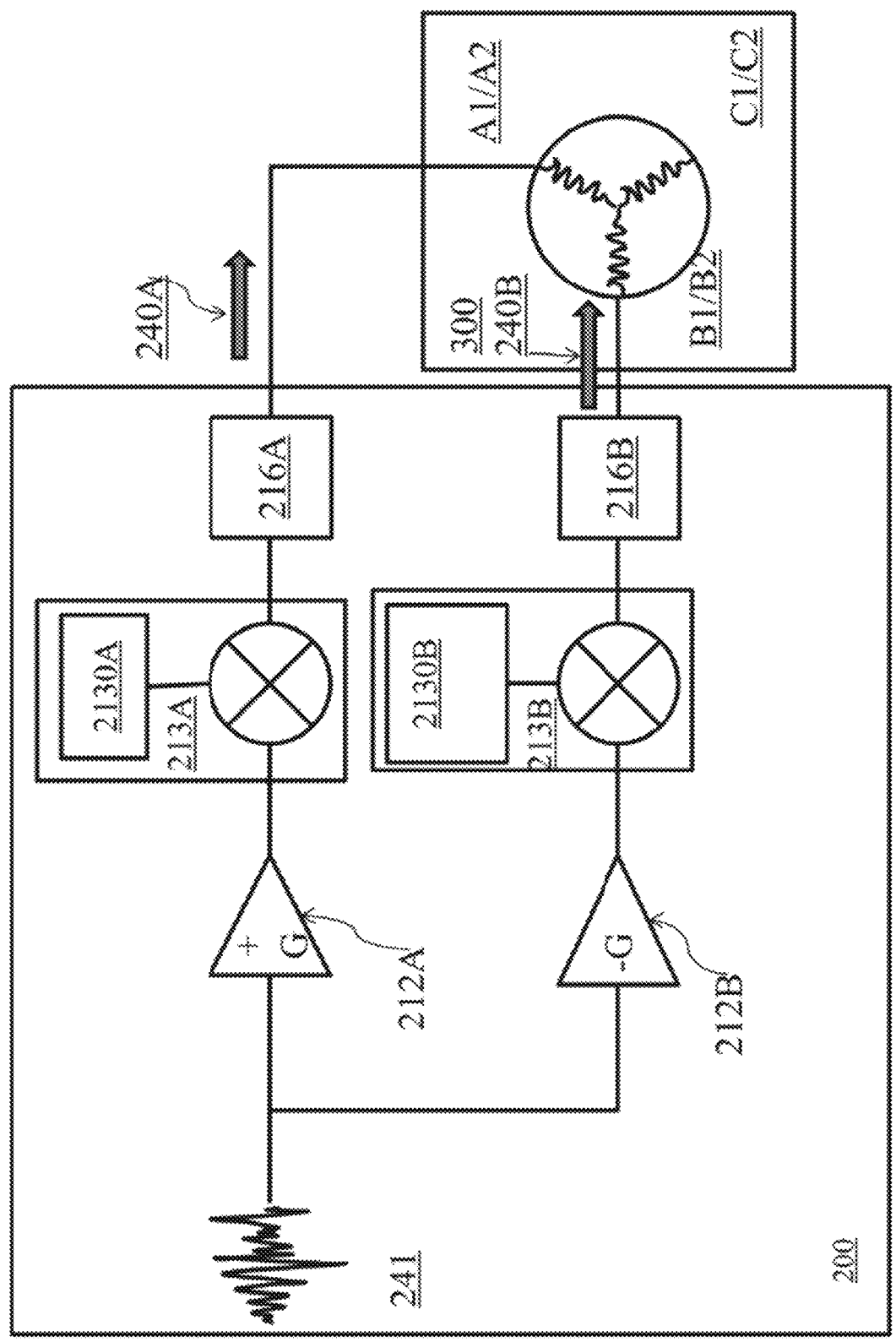

FIG. 20 is an exemplary detail diagram illustrating an alternative embodiment of the motor controller 200 of FIG. 14. FIG. 20 shows that no motor-driving signal 240 is provided to the stator coil pair C1/C2. The amplifier 212A can have a positive gain +G. The amplifier 212B can have a negative gain −G to invert the audio signal 241. The motor-driving signals 240A, 240B can drive the rotor 330 to vibrate according the mechanism as shown in FIG. 8.

Figure 21:
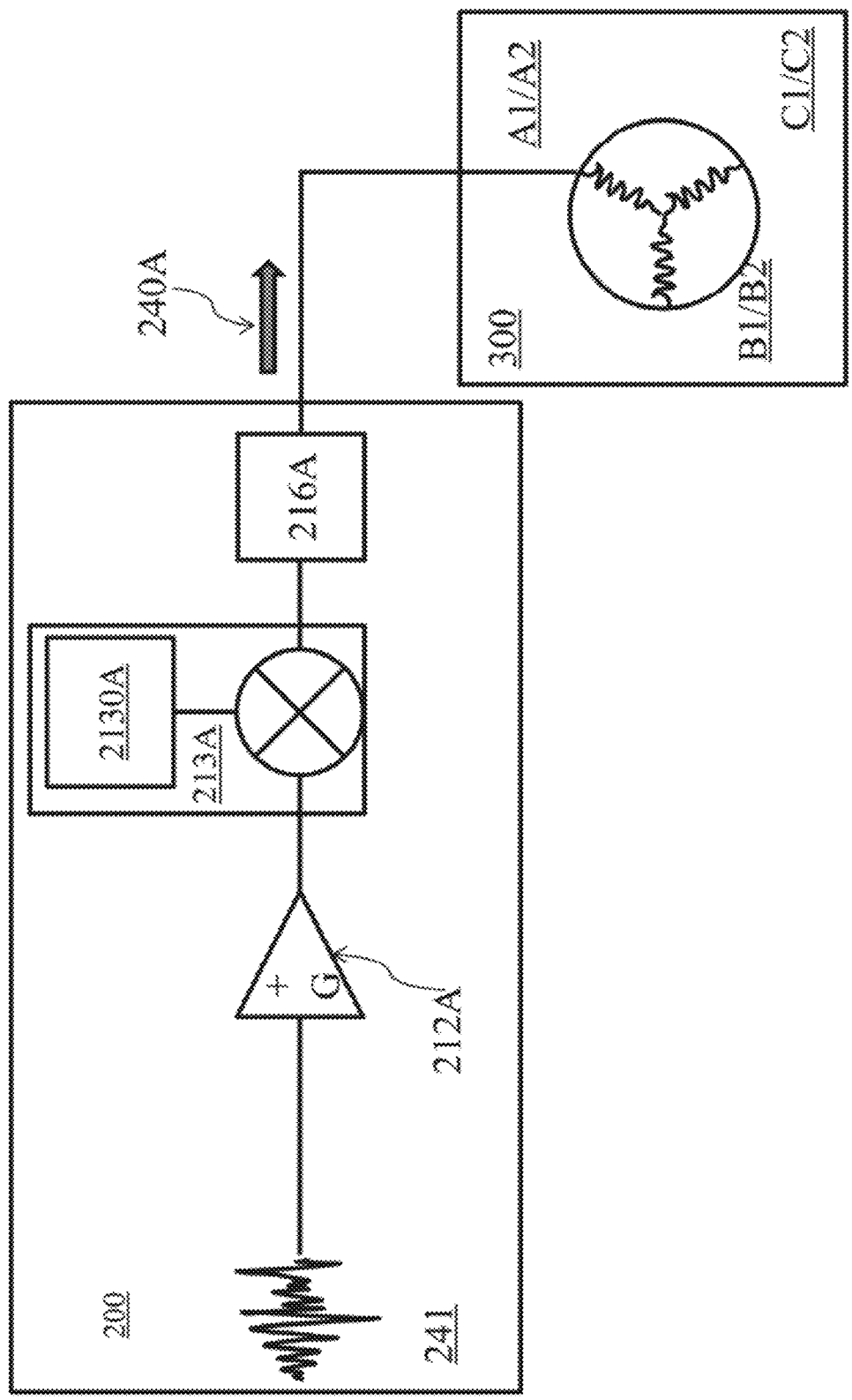

FIG. 21 is an exemplary detail diagram illustrating another alternative embodiment of the motor controller 200 of FIG. 1. FIG. 21 shows that no motor-driving signal is provided to the stator coil pairs B1/B2, C1/C2. Although the amplifier 212A is shown as having a positive gain +G, the amplifier 212A can have a negative gain −G, without limitation. The motor-driving signals 240A can drive the rotor 330 to vibrate, according the mechanism as shown in FIG. 12.

Configurations of the motor controller 200 are not limited to FIGS. 14, 16-21. In order to generate the vibration 370 as shown in FIG. 2, parameters of the motor controller 200 can be adjusted to generate two competing magnetic fields. Respective directions of the two competing magnetic fields can be different. Further, a difference between respective magnitudes of the two competing magnetic fields can oscillate between a negative value and a positive value (shown in FIGS. 11-12). The two competing magnetic fields can enable the rotor 330 to vibrate. Any configuration of the motor controller 200 for generating such two competing magnetic fields can enable the rotor 330 to generate the sound 320 and is within the scope of the present disclosure.

Further, the audio signal 241 can be a digital signal and/or an analog signal. Configurations of the motor controller 200 as shown FIGS. 14, 16-21 can be implemented by the processor(s) 210 and/or one or more discrete circuits (not shown). In certain embodiments, the audio signal 241 can be digital, and the configurations of the motor controller 200 shown FIGS. 14, 16-21, and/or equivalents thereof, can be implemented by the processor(s) 210. Advantageously, no additional hardware is necessary for implementing the methods as disclosed herein, such as the method 1000 in FIG. 2.

The audio signal 241 can be obtained using any suitable process. FIG. 22 is an exemplary diagram illustrating another alternative embodiment of the system 100 of FIG. 1. The audio signal 241 can be stored on the memory 420 of the main controller 400. Additionally and/or alternatively, an audio file (not shown) can be stored on the memory 420 on the main controller 400, and the main controller 400 can include a decoder (not shown) to decode the audio file into the audio signal 241.

The main controller 400 can send the audio signal 241 to the motor controller 200. The motor controller 200 can thus receive the audio signal 241 from the controller 200 via the control signal line 430 and/or the data communication line 440 coupling the main controller 400 with the motor controller 200.

FIG. 23 is an exemplary diagram illustrating another alternative embodiment of the system 100 of FIG. 1, wherein the motor controller 200 includes an audio signal decoder 250. An exemplary audio signal decoder 250 can be at least partially integrated in the processor(s) 210. An audio file 243 can be stored on the memory 420 on the main controller 400. The main controller 400 can send the audio file 243 to the motor controller 200. The motor controller 200 can thus receive the audio file 243 from the controller 200 via the control signal line 430 and/or the data communication line 440 that couple the main controller 400 with the motor controller 200. The audio signal decoder 250 can be configured to create the audio signal 241 by decoding the audio file 243. The audio signal decoder 250 can include a conventional decoding program executable using the processor(s) 210, and/or discrete circuits suitable for decoding the audio file 243.

The audio file 243 can include a computer-readable file for storing the audio signal 241 in any conventional format. Exemplary formats can include uncompressed audio formats, such as Waveform Audio File Format (WAV), Audio Interchange File Format (AIFF), Au file format (AU) and/or raw header-less Pulse-code modulation (PCM). Additionally and/or alternatively, the formats can include formats with lossless compression, such as Free Lossless Audio Codec (FLAC), Monkey's Audio (filename extension .ape), WavPack (filename extension .wv), True Audio codec (TTA), Adaptive Transform Acoustic Coding (ATRAC) Advanced Lossless, Apple Lossless Audio Codec (ALAC) (filename extension .m4a), Moving Picture Experts Group (MPEG)-4 Scalable to Lossless (SLS), MPEG-4 Audio Lossless Coding (ALS), MPEG-4 Direct Stream Transfer (DST), Windows Media Audio Lossless (WMA Lossless), and/or Shorten (SHN). Additionally and/or alternatively, the formats can include formats with lossy compression, such as Opus (developed by the Internet Engineering Task Force), MPEG-1 or MPEG-2 Audio Layer III (MP3), Vorbis developed by the Xiph.Org Foundation, Somerville, Mass., United States), Advanced Audio Coding (AAC), ATRAC and/or Windows Media Audio Lossy (WMA lossy).

Figure 24:
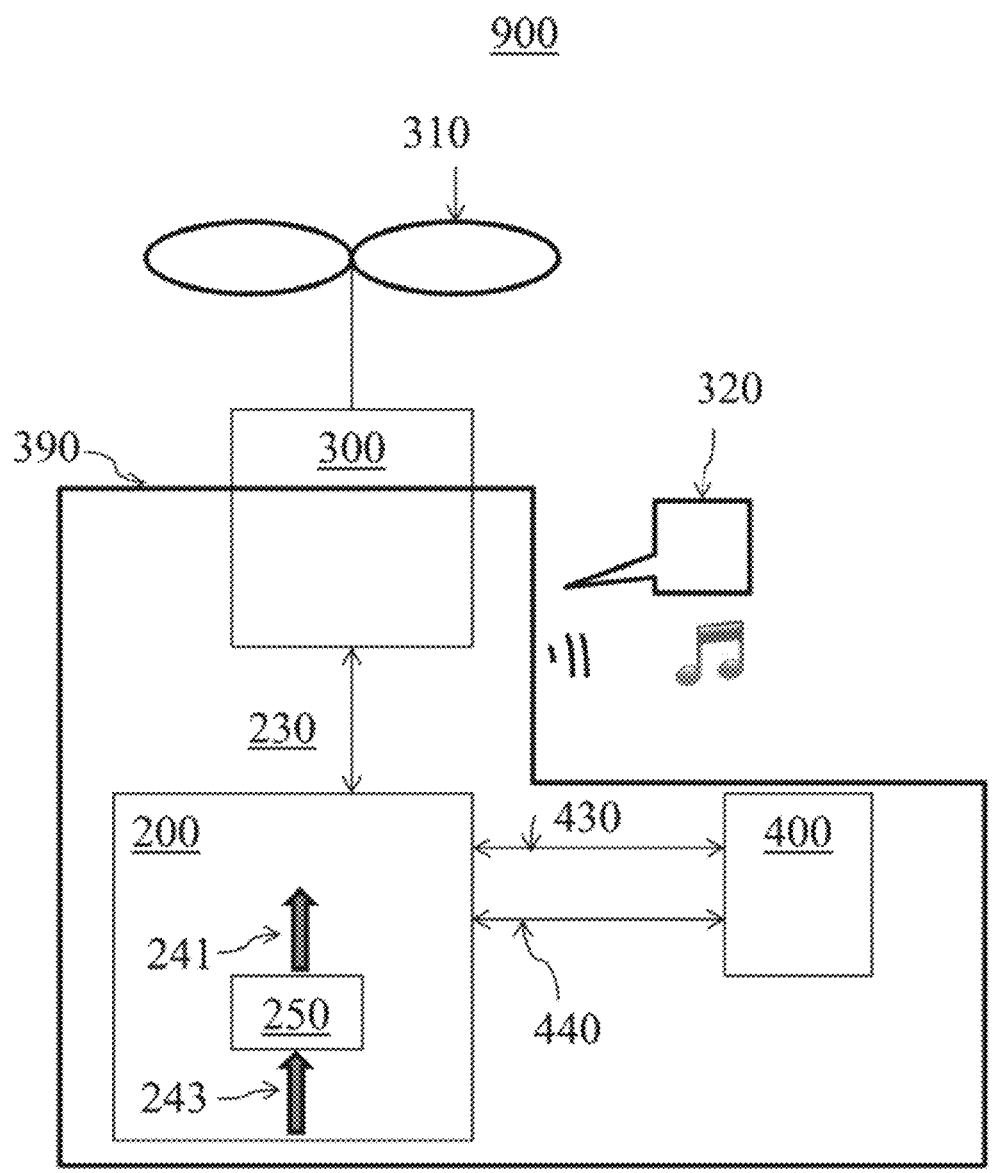

FIG. 24 is an exemplary diagram illustrating another alternative embodiment of the system of FIG. 1, wherein the motor controller 200 includes the audio signal decoder 250. Further, the audio file 243 can be stored on the memory 220 on the motor controller 200. The motor controller 200 can be configured to retrieve the audio file 243 from the memory 220. The audio signal decoder 250 can be configured to create the audio signal 241 by decoding the audio file 243.

Figure 25:
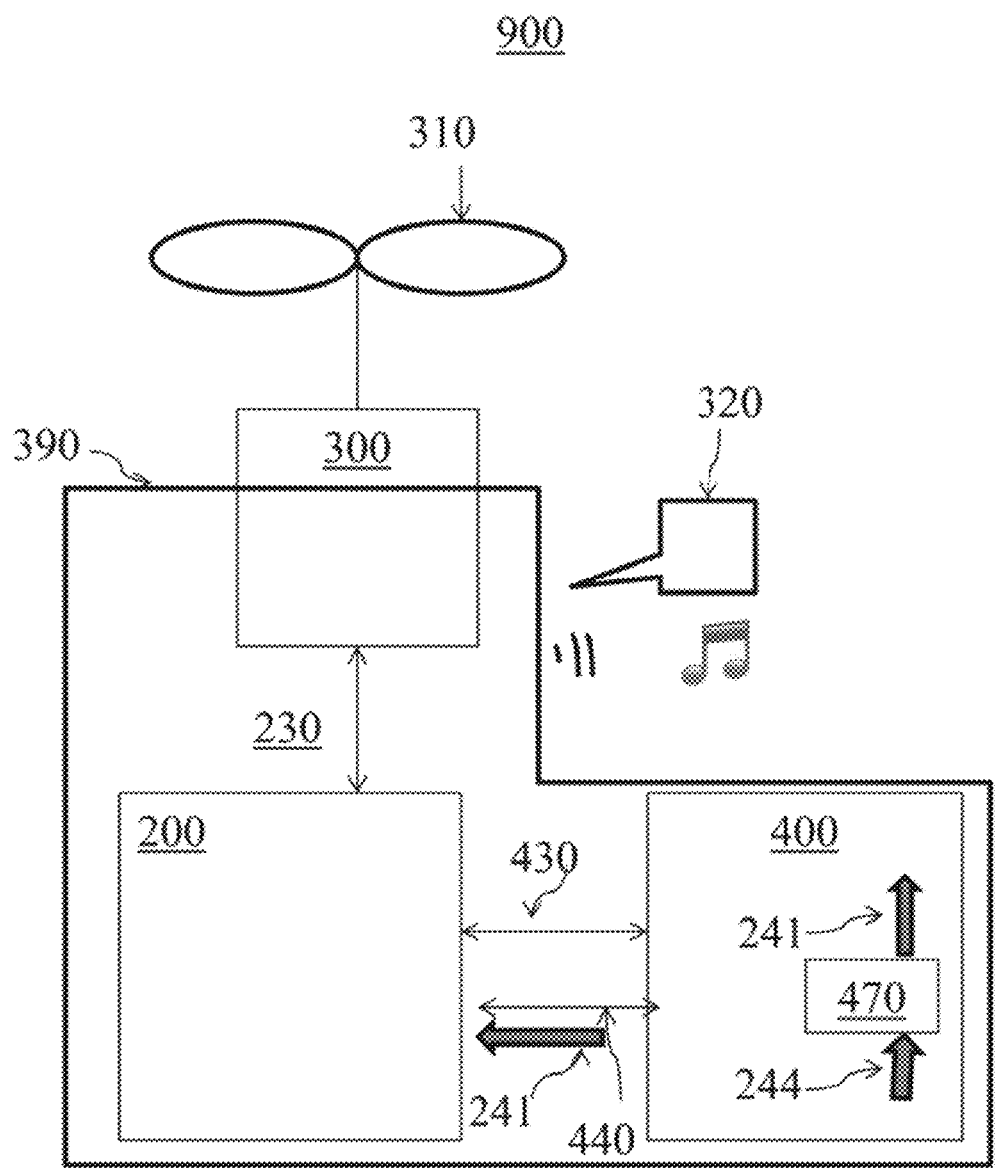
FIGS. 25-26 are exemplary diagrams illustrating respective alternative embodiments of the system of FIG. 1, wherein the motor controller of the system includes a signal converter.

In certain cases, the audio signal 241 to be processed in the motor controller 200 (shown in FIGS. 14, 16-21) can be digital. In those cases, the system 100 can be configured to execute an analog-to digital conversion for an analog audio signal to generate the audio signal 241. FIG. 25 is an exemplary diagram illustrating another alternative embodiment of the system 100 of FIG. 1, wherein the main controller 400 of the system 100 can include a signal converter 470. The signal converter 470 can include an analog-to-digital converter (ADC) configured to convert an analog audio signal 244 to the audio signal 241 that is digital.

The main controller 400 can be configured to receive the analog audio signal 244 using any suitable method. For example, the communication module 460 (shown in FIG. 6) on the main controller 400 can receive a radio wave modulated with the audio signal 244. The processor(s) 410 and/or other circuits on the main controller 400 can be configured to demodulate the radio wave to obtain the audio signal 244.

The main controller 400 can send the audio signal 241 to the motor controller 200. The motor controller 200 can thus receive the audio signal 241 from the controller 200 via the control signal line 430 and/or the data communication line 440 coupling the main controller 400 with the motor controller 200.

Figure 26:
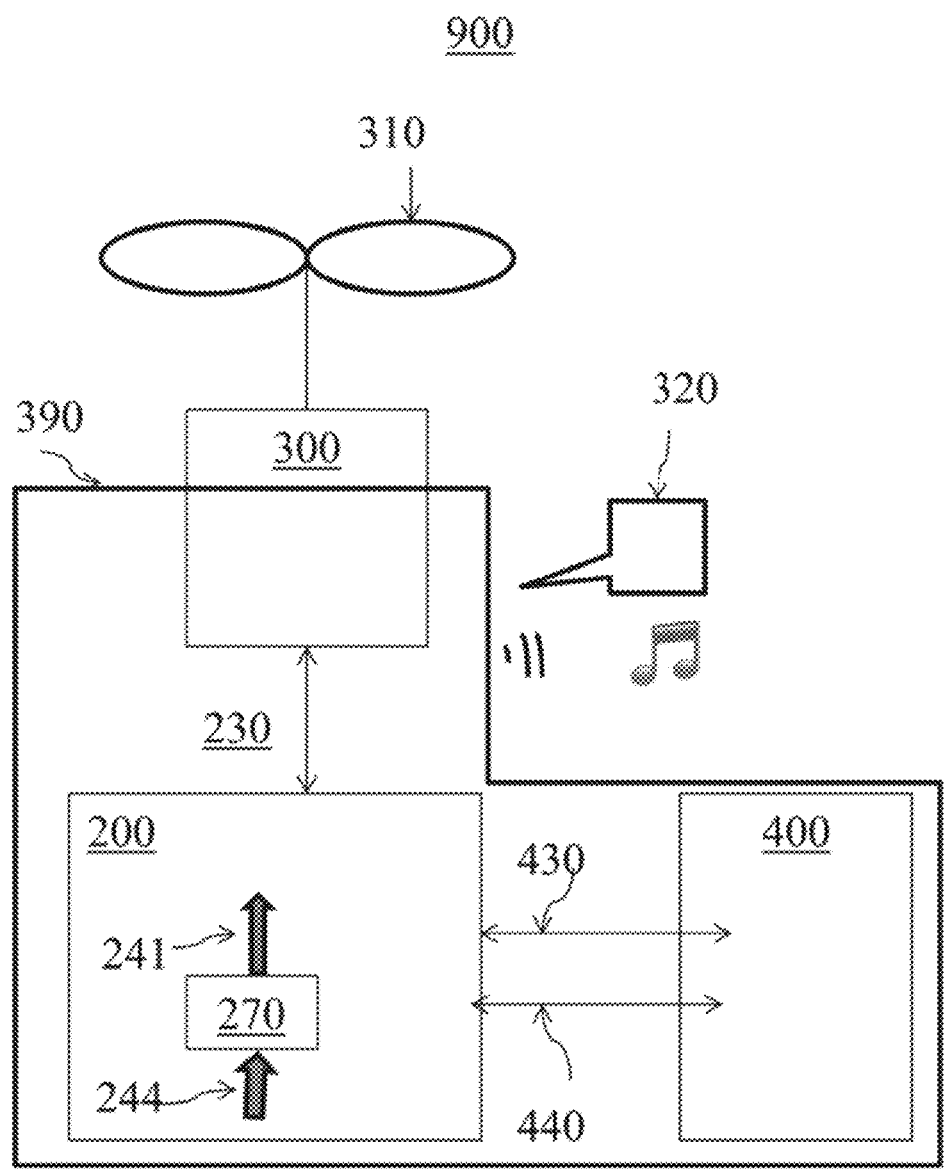

FIG. 26 is an exemplary diagram illustrating another alternative embodiment of the system 100 of FIG. 1, wherein the motor controller 200 of the system 100 can include a signal converter 270. The signal converter 270 can include an analog-to-digital converter (ADC) configured to convert an analog audio signal 244 to the audio signal 241 that is digital.

The main controller 400 can be configured to receive the analog audio signal 244 using any suitable method. For example, the communication module 260 (shown in FIG. 6) on the motor controller 200 can receive a radio wave modulated with the audio signal 244. The processor(s) 210 and/or other circuits on the controller 200 can be configured to demodulate the radio wave to obtain the audio signal 244.

Additionally and/or alternatively, the main controller 400 can transmit the analog audio signal 244 to the motor controller 200. The motor controller 200 can thus receive the analog audio signal 244 from the controller 200 via the control signal line 430 and/or the data communication line 440 coupling the main controller 400 with the motor controller 200.

Using the systems 100 illustrated in FIGS. 25-26, a sound generated at a remote distance from the mobile platform 900 can be reproduced by the mobile platform 900 in real time. For example, an input audio signal, such as an audible sound, an ultrasound wave, and/or an infrasound wave, can be converted to the analog audio signal 244 via a device such as a microphone. The microphone can be coupled to a transmitter. The transmitter can be integrated with a computer device and/or a radio station located remotely relative to the mobile platform 900. The computer device and/or a radio station can modulate a radio wave with the analog audio signal 244. The transmitter can transmit the modulated radio wave to the system 100.

The system 100 can include a demodulator (not shown) on the motor controller 200 and/or the main controller 400 to demodulate the radio wave and obtain the analog audio signal 244. The analog audio signal 244 can be processed by the system 100 as shown in FIGS. 25-26. The motor 300 of the system 100 can be configured to generate the sound in real time. The sound can replicate the input audio signal. For example, when the system includes a UAV, the UAV can generate a sound that can have the same audio content as the remotely-generated input audio signal.

Additionally and/or alternatively, using the systems 100 illustrated in FIGS. 22-26, the sound 320 can be reproduced by the mobile platform 900 in a time-delayed manner. For example, the analog audio signal 244 can be generated at a remote distance from the mobile platform 900 and converted to the audio signal 241 via an analog-to-digital converter (ADC) on a computer (not shown) remote from the mobile platform 900. The audio signal 241 can be stored in the audio file 243. The audio file 243 can be transmitted by the computer to the communication module 460 and/or the communication module 260 to be decoded into the audio signal 241 subsequently (shown in FIGS. 23-24).

In another example, the analog audio signal 244 is converted to the audio signal 241 via the signal converter 270 and/or the signal converter 470 (shown in FIGS. 25-26). The motor controller 200 and/or the main controller 400 can include an encoder for encoding the audio signal 241 into the audio file 243. The audio file 243 can thereby be decoded into the audio signal 241 subsequently (shown in FIGS. 22-24).

Figure 27:
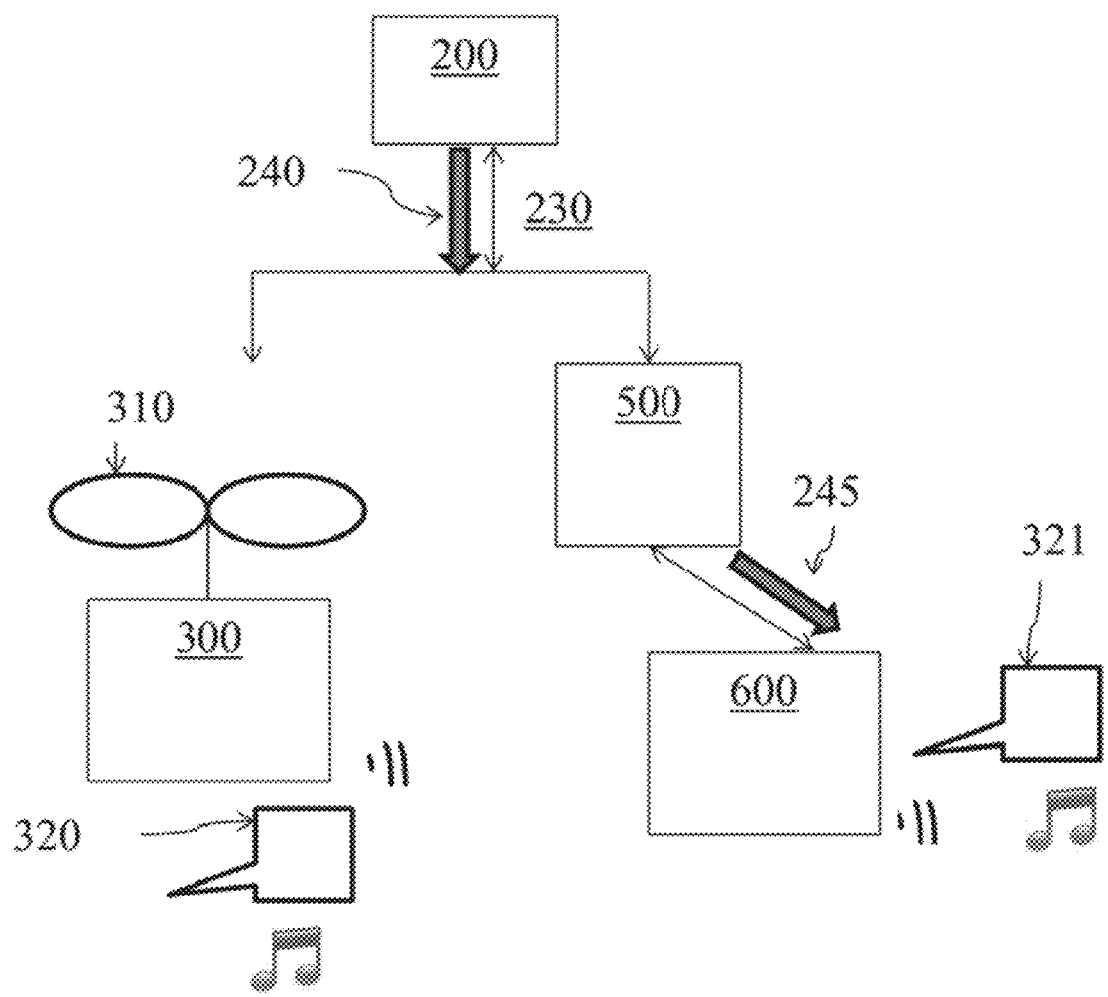
FIG. 27 is an exemplary diagram illustrating another alternative embodiment of the system of FIG. 1, wherein a motor-driving signal is demodulated.

According to FIGS. 14, 16-21, the motor-driving signal 240 can be directly provided to the motor 300 for generating the sound 320 (shown in FIG. 6). Furthermore, the motor-driving signal 240 can be used for generating the sound 320 via additionally and/or alternatively ways. FIG. 27 is an exemplary diagram illustrating alternative embodiments of the system of FIG. 1, wherein the motor-driving signal 240 is demodulated. As shown in FIG. 27, the motor-driving signal 240 outputted by the motor controller 200 can be inputted into a demodulator 500. The motor-driving signal 240 inputted into the demodulator 500 can include one or more of the motor-driving signals 240A, 240B, 240C. The demodulator 500 can be at least partially integrated with and/or separated from the system 100. The demodulator 500 shown in FIG. 27 can be configured to extract the audio signal 241 from a carrier wave. For example, when the encoder 216 (shown in FIG. 15) modulates a pulsing signal with the audio signal 241 by using PWM, the demodulator 500 can be configured to remove the audio signal 241 from the pulsing signal. For example, the demodulate 500 can filter out the pulsing signal having a sampling frequency of the PWM.

The demodulator 500 can include any processor and/or discrete circuits for separating the audio signal 241 from the pulsing signal. An exemplary demodulator 500 can include one or more filters enabled to filter a signal via a bandwidth from 20 Hz to 20 kHz, a band-pass filter having a bandwidth from 20 Hz to 20 kHz, and/or a low-pass filter having a cut-off frequency of 20 kHz. Upon being processed by the demodulator 500, the motor-driving signal 240 can be converted to a demodulated audio signal 245. The demodulated audio signal 245 can have a waveform similar and/or identical to the audio signal 241 shown in FIGS. 14, 16-21. The demodulated audio signal 245 can drive a conventional loudspeaker and/or headphone, to generate an audio content 321. The sound 321 can be similar and/or identical to the sound 321.

In one example, upon being filtered by the band-pass filter having a bandwidth from 20 Hz to 20 kHz, the motor-driving signal 240 can be enabled to drive the speaker 600 to generate the audio content 321 consistent with the sound 320 generated by the motor 300. For example, the sound 320 can include oral speech. The motor-driving signal 240 is enabled to drive the loudspeaker 600 to generate the audio content 321 including an oral content. The speech can be consistent with the oral content. For illustrative purposes, the speech can include a sentence 'remote control signal is lost.' The oral content can include the sentence 'remote control signal is lost' audible to a human ear. That is, based on human hearing, the oral content can convey the same syllables as the speech of the sound 320.

The oral content is not limited to human speech. For example, the sound 320 can include animal sound. The motor-driving signal 240 is enabled to drive the loudspeaker 600 to generate the audio content 321 including an oral content consistent with the animal sound. For illustrative purposes, the sound 320 can include a dog bark. The oral content can include the dog bark audible to a human ear. That is, based on human hearing, the oral content can convey the same and/or similar syllables (or phonetics) as the sound 320.

In another example, the sound 320 can include music. The motor-driving signal 240 is enabled to drive the loudspeaker 600 to generate the audio content 321 including a musical content. The music can be consistent with the musical content. For illustrative purposes, the music can include a tune of 'Jingle Bells'. The oral content can include the tune of 'Jingle Bells' audible to a human ear. That is, based on human hearing, the musical content can convey the same melody and/or rhythm as the music of the sound 320.

FIG. 27 illustrates both the sound 320 and the audio content 321 as generated, for illustrative purposes only. The sound 320 and the audio content 321 can be generated independent of each other. For example, the motor-driving signal 240 can drive the motor 300 to generate a sound during an operation (e.g., landing, taking off, flight operation) of the mobile platform 900. The mobile platform 900 does not necessarily include the loudspeaker 600 and/or the demodulator 500. For analyzing and/or diagnosing the motor-driving signal 240, the loudspeaker 600 and/or the demodulator 500 can be connected to the motor-driving signal line 230 of the motor controller 200 to intercept the motor-driving signal 240 (shown in FIG. 27).

Figure 28:
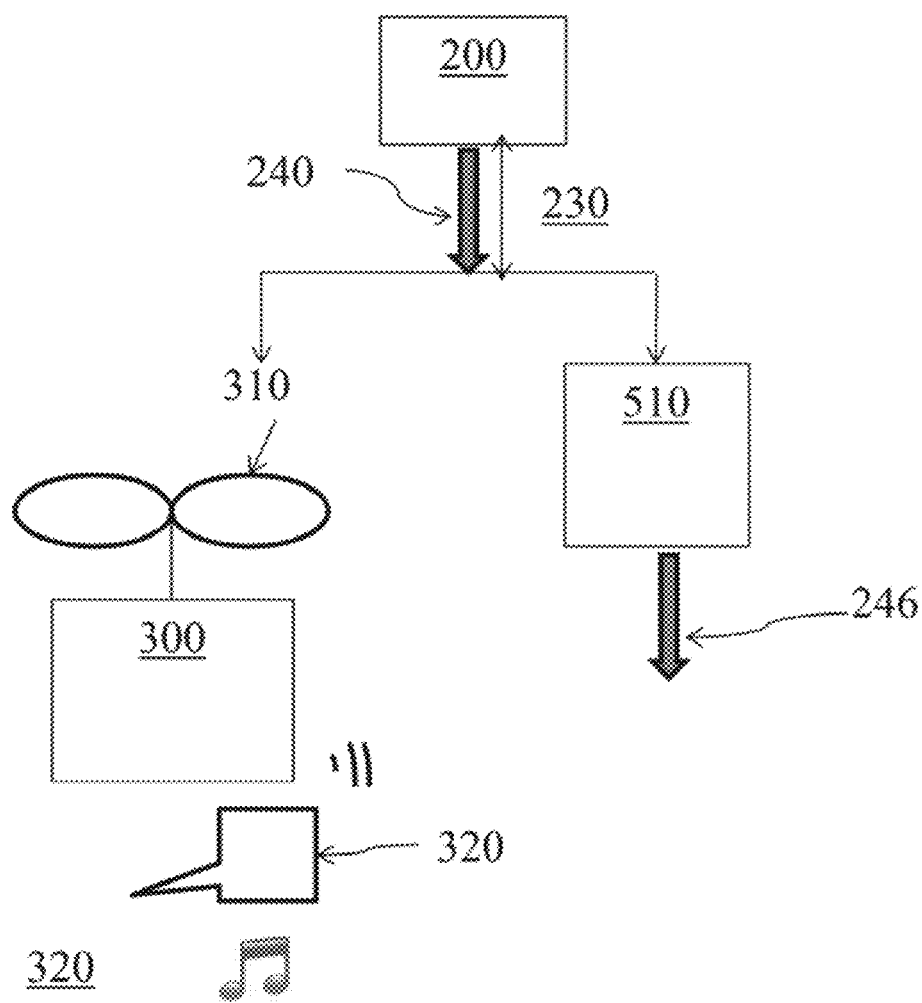
FIG. 28 is an exemplary diagram illustrating another alternative embodiment of the system of FIG. 1, wherein the motor-driving signal is filtered.

FIG. 28 is an exemplary diagram illustrating alternative embodiments of the system 100 of FIG. 1, wherein the motor-driving signal 240 is filtered. The motor-driving signal 240 is shown in FIG. 28 as being inputted into a filter 510. The motor-driving signal 240 inputted into the filter 510 can include one or more of the motor-driving signals 240A, 240B, 240C.

The filter 510 can include a low-pass filter. An exemplary filter 510 can have a cutoff frequency less than 20 Hz. Thus, the DC signals 2130A, 2130B, 2130C can remain, and the audio signal 241 can be removed. The filter 510 can thus produce an output signal 245. When the motor-driving signal 240 inputted into the demodulator 500 includes the motor-driving signal 240A, the motor-driving signal 240B, or the motor-driving signal 240C (shown in FIGS. 16-21), the output signal 245 can correspondingly include the DC signal 2130A, the DC signal 2130B, or the DC signal 2130A, respectively.

In other words, upon being filtered by a low-pass filter having a cutoff frequency of 20 Hz or lower, the motor-driving signal 240 can include a DC bias signal. The DC bias signal can include the DC signal applied by the DC signal unit 213 (shown in FIG. 14).

As previously described above with reference to FIG. 6, the system 100 can be installed on a mobile platform and/or a UAV. Further, various embodiments disclosed herein provide a kit for assembling the system 100, the mobile platform 900, and/or the UAV. The kit can be a kit for assembling the mobile platform and/or the UAV. The kit can include one or more of the motor controller 200, the motor 300, and/or the main controller 400 as shown throughout the present disclosure, for example, in FIGS. 1, 6-26. The kit can be used for assembling the system 100 instead of acquiring a factory-assembled system 100. In certain embodiments, an instruction manual can be included in the kit. The instruction manual may have instructions thereon. When an operator and/or machine follows the instructions, the motor controller 200, the motor 300, and/or the main controller 400 can be assembled into the system 100 as shown in the present disclosure.

Further, the motor controller 200, the motor 300, and/or the main controller 400 is not necessarily pre-assembled, and may be assembled according to the instruction manual. For example, the stationary device 340 and/or the movable device 330 (shown in FIG. 7) may be included in the kit and configured to be coupled to each other according to the instruction manual.

Various embodiments further disclose computer program product comprising instructions for generating sound in accordance with the methods disclosed herein, e.g., as shown in FIG. 2. The program/software can be stored in a (non-transitory) computer-readable storage medium including, e.g., Read-Only Memory (ROM), Random Access Memory (RAM), internal memory, register, computer hard disk, removable disk, CD-ROM, optical disk, floppy disk, magnetic disk, or the like. The program/software can include coded instructions to instruct one or more processors on a computer device to execute the methods in accordance with various disclosed embodiments.

Figure 29:
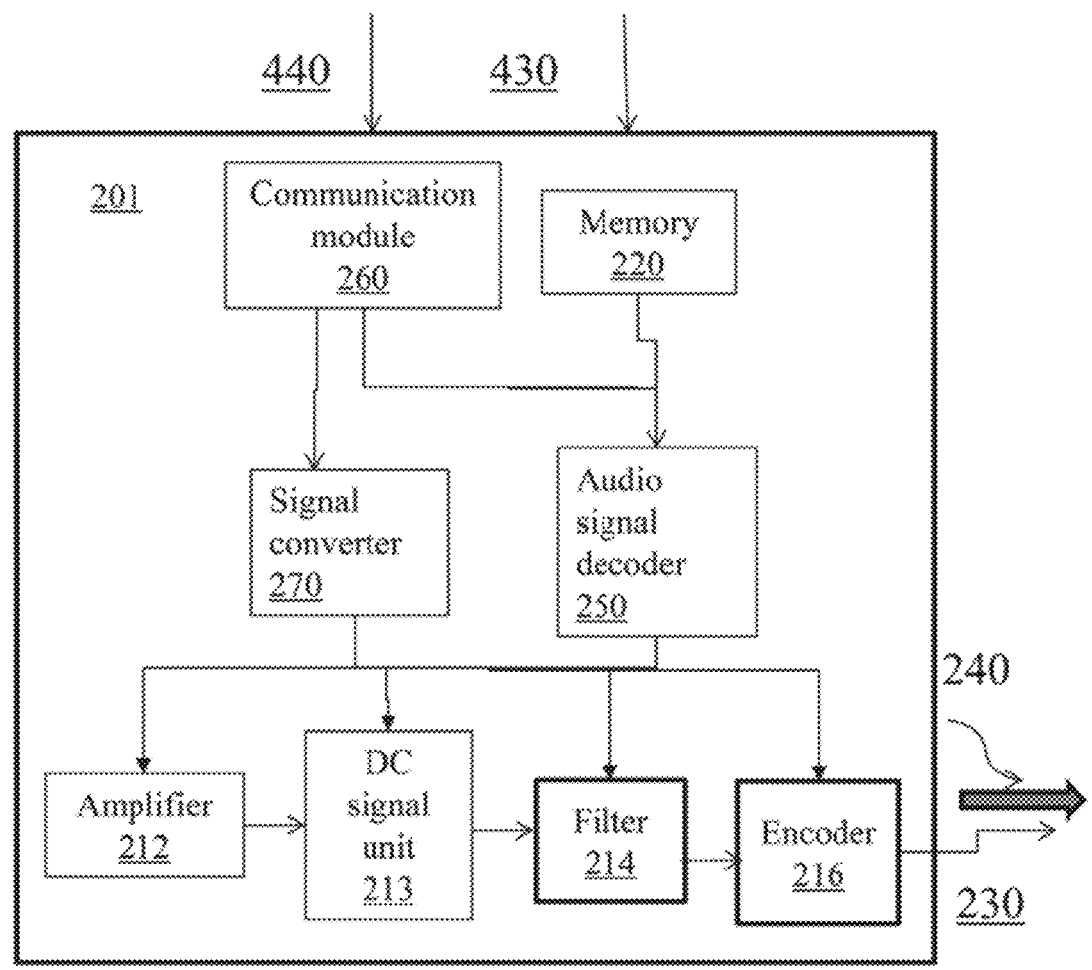
FIG. 29 is an exemplary diagram illustrating an embodiment of an apparatus for controlling the motor of FIG. 1.

FIG. 29 is an exemplary diagram illustrating an embodiment of an apparatus 201 for controlling the motor of FIG. 1. The apparatus 201 can function as an electronic speed control (ESC). In other words, the apparatus 201 can include the motor main controller 400 with reference to FIGS. 1, 6, 14, and 16-26. The apparatus 201 can include microprocessor(s) and/or discrete circuit hardware for implementing functions of the apparatus 201 as disclosed herein.

As shown in FIG. 29, the apparatus 201 can include the encoder 216 configured to encode the motor-driving signal 240 with the audio signal 241 as shown in FIG. 14. The audio signal 241 can be digital. The encoder 216 can be configured to modulate a pulsing signal with the audio signal 241 to produce the motor-driving signal 240. The encoder 216 can be configured to modulate the pulsing signal with the audio signal 241 using PWM.

The encoder 216 can be configured to drive the motor 300 with the motor-driving signal 240 to generate the sound 320 corresponding to the audio signal 241. The encoder 216 can be configured to vibrate the rotor 330 of the motor 300 relative to the equilibrium position 380 of the rotor 330 based upon the motor-driving signal 240.

The apparatus 201 can further include the DC signal unit 213 configured to superimpose a direct current (DC) signal on the audio signal, the DC signal being configured to adjust the equilibrium position 380 of the rotor 330 relative to the stator 340. The DC signal unit 213 can be configured to change a volume of the sound 320 by adjusting the equilibrium position 380 of the rotor 330 relative to a stator 340 based upon the motor-driving signal 240.

The apparatus 201 can further include a filter 204 configured to filter the audio signal 241. The apparatus 201 can further include an amplifier 212 configured to amplify the audio signal 241.

When the audio signal 241 is digital, the apparatus 201 can include the signal converter 270 configured to convert an analog audio signal into the audio signal 241.

The apparatus 201 can further include the communication module 260 configured to receive the audio signal 241 from the main controller 400 via a control signal line 430 and/or a data communication line 440 (shown in FIG. 6) coupling the main controller 400 with the apparatus 201. The apparatus 201 and/or the main controller 400 can be associated with the mobile platform 900. The signal converter 270 can receive the analog audio signal from the main controller 400 (shown in FIG. 6) and/or another computer system (not shown) via the communication module 260.

The apparatus 201 can further include the audio signal decoder 250 configured to create the audio signal 241 by decoding the audio file 243 (shown in FIGS. 23-24).

The communication module 260 can be configured to receive the audio file 243 from the main controller 400 via the control signal line 430 and/or the data communication line 440 coupling the main controller 400 with the apparatus 201.

The apparatus 201 can further include the memory 220 for storing the audio file 243. The apparatus 201 can be configured to retrieve the audio file 243 from the memory 220. For example, the encoder 216, the filter 214, the DC signal unit 213, the amplifier 212, the communication module 260, and/or the audio signal decoder 250 can be configured to retrieve the audio file 243 from the memory 220.

The audio signal 241 can be processed by the amplifier 212, the DC signal unit 213, the filter 214, and/or the encoder 216 sequentially as shown in FIG. 29, and similarly in FIGS. 14, 16-21. However, sequence of the amplifier 212, the DC signal unit 213, the filter 214, and/or the encoder 216 can be different from the sequence shown in FIGS. 14, 16-21, 29. For example, the filter 214 can precede the DC signal unit 213. Further, the amplifier 212, the DC signal unit 213, the filter 214, and/or the encoder 216 can be omitted. For example, the amplifier 212 and/or the filter 214 can be omitted.

In certain embodiments, functions of the encoder 216 can be implemented by one or more processors comprising integrated circuits. Functions of the filter 214, the DC signal unit 213, the amplifier 212 and/or the signal converter 270 can be implemented by processor(s) and/or discrete circuits.

For illustrative purposes, methods and systems disclosed herein are shown as enabling the vibration 370 of the motor 300 when the system 100 is stationary, i.e., the motor 300 is not causing the system 100 to move. However, the methods and systems disclosed herein can enable the vibration 370 of the motor 300 while the motor 300 is generating a motion, such as a rotating motion, for moving the system 100. That is, the rotor 330 (shown in FIGS. 8-12) can rotate at the same time when the vibration 370 is implemented. For certain mobile platform applications, the rotor 330 does not need to rotate at a frequency equal to the frequency of the audio signal. For the rotor 330 may rotate at a frequency (and/or number of cycles per unit time) lower than the frequency of the audio signal. In that case, inertia of the rotor 330 can enable the rotor 330 to rotate while the vibration 370 is superimposed on the rotating motion.

According to the various disclosed embodiments, the motor 300 can be enabled to generate a high-quality sound while generating a mechanical motion. For example, the motor 300 can generate a high-quality sound while enabling the mobile platform 900 (shown in FIG. 6), such as a UAV, to move. The motor-driving signal 240 driving the motor 300 to generate the sound 320 can be produced by computer-executable instructions without the need of installing addition hardware audio instrument. As a result, without increasing weight and/or affecting a flight time, a UAV can generate high-quality sound.

With the capability of generating high-quality sound, the mobile platform (shown in FIG. 6), such as the UAV, can communicate with a human being in a user-friendly way. For example, when a UAV needs to inform a human that 'remote control signal is lost', conventional communication conveys the message by using a certain light signal or a single frequency beep. The human needs to look up in a manual for the message, which can be time-consuming and prone to error. Using the disclosed methods and systems, the UAV is able to generate the sound including the oral content 'remote control signal is lost'. The human can immediately understand the message without looking up the manual. Communication can thus be fast and accurate. User experience can be greatly improved.

Further, the mobile platform 900 (such as a UAV) may have multiple motors 300, each driven by a respective motor controller 200. Each motor controller 200A can produce a respective motor-driving signal 240. Each of the motors 300 can thus generate different/uniform sounds 320. For example, each motor 300 can generate a low-frequency component, a mid-frequency component, and a high frequency component of a musical piece, such as different parts of a symphonic piece, to create a stereo-like effect. Thus, the sound 320 can be of high quality and provide entertaining experience to the human.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for generating sound with a motor, comprising:
   generating a first motor-driving signal for a first stator coil pair and a second motor-driving signal for a second stator coil pair;
   applying the first motor-driving signal and the second motor-driving signal to the first stator coil pair and the second stator coil pair of the motor, respectively, to control a rotor of the motor to determine an equilibrium position corresponding to at least one of the first motor-driving signal or the second motor-driving signal, wherein the first motor-driving signal and the second motor-driving signal drive the rotor of the motor to vibrate relative to the equilibrium position to generate a sound corresponding to an audio signal component;
   applying a bandpass filter to the first motor-driving signal and the second motor-driving signal to generate a first filtered motor-driving signal and a second filtered motor-driving signal, respectively; and
   applying the first filtered motor-driving signal and the second filtered motor-driving signal to a speaker to present audio content consistent with the sound generated by the motor.

2. The method of claim 1, wherein the first motor-driving signal and the second motor-driving signal are filtered by the bandpass filter to a bandwidth of 20 Hz to 20 kHz.

3. The method of claim 1, wherein generating the first motor-driving signal and the second motor-driving signal includes generating the audio signal component based on an audio signal.

4. The method of claim 3, wherein generating the first motor-driving signal and the second motor-driving signal includes modulating a pulse signal with the audio signal.

5. The method of claim 4, wherein the pulse signal is modulated with the audio signal using pulse-width modulation.

6. The method of claim 4, further comprising receiving the audio signal from a main controller of the mobile platform.

7. The method of claim 4, further comprising decoding an audio file and obtaining the audio signal from the decoded audio file.

8. The method of claim 1, wherein the first motor-driving signal has a first direct-circuit (DC) component, the second motor-driving signal has a second DC component.

9. The method of claim 8, further comprising:
   adjusting a volume of the sound generated by the motor by adjusting the equilibrium position.

10. The method of claim 9, wherein adjusting the volume of the sound includes adjusting the equilibrium position by adjusting at least one of the first DC component of the first motor-driving signal or the second DC component of the second motor-driving signal.

11. The method of claim 1, further comprising amplifying the sound by vibrating a motor casing that at least partially encloses the rotor.

12. The method of claim 1, wherein the first motor-driving signal and the second motor-driving signal drive the rotor to vibrate along a radial direction of the motor to generate the sound.

13. The method of claim 1, wherein the first motor-driving signal and the second motor-driving signal further drive the motor to enable a mobile platform to move.

14. A system for generating sound, comprising:
   a motor having a rotor;
   a speaker; and
   one or more processors configured to:
      generate a first motor-driving signal for a first stator coil pair and a second motor-driving signal for a second stator coil pair;
      apply the first motor-driving signal and the second motor-driving signal to the first stator coil pair and the second stator coil pair of the motor, respectively, to control a rotor of the motor to determine an equilibrium position corresponding to at least one of the first motor-driving signal or the second motor-driving signal, wherein the first motor-driving signal and the second motor-driving signal drive the rotor of the motor to vibrate relative to the equilibrium position to generate a sound corresponding to an audio signal component;
      apply a bandpass filter to the first motor-driving signal and the second motor-driving signal to generate a first filtered motor-driving signal and a second filtered motor-driving signal, respectively; and
      apply the first filtered motor-driving signal and the second filtered motor-driving signal to the speaker to present audio content consistent with the sound generated by the motor.

15. The system of claim 14, wherein the first motor-driving signal and the second motor-driving signal are filtered by the bandpass filter to a bandwidth of 20 Hz to 20 kHz.

16. The system of claim 14, wherein the motor is configured to enable a mobile platform to move.

17. The system of claim 14, wherein the first motor-driving signal has a first direct-circuit (DC) component, the second motor-driving signal has a second DC component, and the one or more processors are further configured to adjust a volume of the sound generated by the motor by adjusting at least one of the first DC component of the first motor-driving signal or the second DC component of the second motor-driving signal.

18. A mobile platform, comprising:
   a motor controller configured to generate a first motor-driving signal for a first stator coil pair and a second motor-driving signal for a second stator coil pair;
   a speaker; and
   a motor being coupled to the motor controller, the motor having a rotor;
   wherein the motor controller is configured to:
      apply the first motor-driving signal and the second motor-driving signal to the first stator coil pair and the second stator coil pair of the motor, respectively, to control a rotor of the motor to determine an equilibrium position corresponding to at least one of the first motor-driving signal or the second motor-driving signal, wherein the first motor-driving signal and the second motor-driving signal drive the rotor of the motor to vibrate relative to the equilibrium position to generate a sound corresponding to an audio signal component;

apply a bandpass filter to the first motor-driving signal and the second motor-driving signal to generate a first filtered motor-driving signal and a second filtered motor-driving signal, respectively; and apply the first filtered motor-driving signal and the second filtered motor-driving signal to the speaker to present audio content consistent with the sound generated by the motor.

19. The mobile platform of claim 18, wherein the motor is driven by the first motor-driving signal and the second motor-driving signal to generate the sound comprising oral content to convey warning or error message associated with an operation of the mobile platform.

20. The method of claim 1, wherein:

an oscillating signal is superimposed on the first motor-driving signal, an inverted signal of the oscillating signal is superimposed on the second motor-driving signal;

the method further comprises:

applying the first motor-driving signal with the oscillating signal to the first stator coil pair of the motor and applying the second motor-driving signal with the inverted signal to the second stator coil pair of the motor to create an oscillating effective magnetic field, wherein the oscillating effective magnetic field drives the rotor of the motor to generate the sound corresponding to the audio signal component.

* * * * *